United States Patent
Kang et al.

(10) Patent No.: US 11,903,089 B2
(45) Date of Patent: Feb. 13, 2024

(54) METHOD AND APPARATUS FOR INSTALLING AND MANAGING MULTIPLE ESIM PROFILES

(71) Applicant: Samsung Electronics Co., Ltd., Suwon-si (KR)

(72) Inventors: Sujung Kang, Suwon-si (KR); Duckey Lee, Suwon-si (KR); Jonghoe Koo, Suwon-si (KR); Kangjin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/397,823

(22) Filed: Aug. 9, 2021

(65) Prior Publication Data

US 2022/0046408 A1 Feb. 10, 2022

(30) Foreign Application Priority Data

Aug. 7, 2020 (KR) .................. 10-2020-0099358
Oct. 23, 2020 (KR) .................. 10-2020-0138646
(Continued)

(51) Int. Cl.
*H04W 8/18* (2009.01)
*H04W 12/06* (2021.01)
*H04W 48/18* (2009.01)

(52) U.S. Cl.
CPC .......... *H04W 8/183* (2013.01); *H04W 12/06* (2013.01); *H04W 48/18* (2013.01)

(58) Field of Classification Search
None
See application file for complete search history.

(56) References Cited

U.S. PATENT DOCUMENTS 10,708,761 B1    7/2020  Yin et al.
2015/0163056 A1*  6/2015  Nix ................. H04L 63/0428
                                             380/46
(Continued)

FOREIGN PATENT DOCUMENTS

EP    2086245 A1 *  8/2009  ............ H04W 72/04
EP    3606117 A1     2/2020
(Continued)

OTHER PUBLICATIONS

International Search Report and Written Opinion of the International Searching Authority dated Nov. 16, 2021, in connection with International Application No. PCT/KR2021/010509, 10 pages.
(Continued)

*Primary Examiner* — Jinsong Hu
*Assistant Examiner* — Alexander J Yi

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure relates to a method and apparatus for connecting communication by downloading and installing one or more communication services in a terminal in a wireless communication system. In addition, the disclosure relates to a method and apparatus for remotely downloading and installing a profile in a terminal, and managing a plurality of installed profiles.

18 Claims, 21 Drawing Sheets

(30) Foreign Application Priority Data

Dec. 1, 2020 (KR) ......................... 10-2020-0166008
Jan. 19, 2021 (KR) ......................... 10-2021-0007619
Apr. 1, 2021 (KR) ......................... 10-2021-0042953
May 21, 2021 (KR) ......................... 10-2021-0065797

(56) References Cited

U.S. PATENT DOCUMENTS

| | | |
|---|---|---|
| 2015/0296379 A1 | 10/2015 | Nix |
| 2016/0006728 A1* | 1/2016 | Park ..................... H04W 12/06 |
| | | 455/411 |
| 2018/0160294 A1 | 6/2018 | Lee et al. |
| 2018/0249322 A1* | 8/2018 | Kim ..................... H04W 8/183 |
| 2020/0128390 A1 | 4/2020 | Lee et al. |
| 2020/0186992 A1 | 6/2020 | Bas Sanchez et al. |

FOREIGN PATENT DOCUMENTS

| | | |
|---|---|---|
| JP | 2009087179 A * | 4/2009 |
| KR | 10-2007-0016698 A | 2/2007 |
| KR | 10-2018-0062923 A | 6/2018 |
| KR | 10-2020-0027555 A | 3/2020 |
| KR | 10-2020-0044629 A | 4/2020 |

OTHER PUBLICATIONS

Trusted Connectivity Alliance, "Interoperability Stepping Stones," Release 7, Dec. 2009, 192 pages.
Supplementary European Search Report dated Nov. 27, 2023, in connection with European Application No. 21852623.4, 10 pages.

\* cited by examiner

METHOD AND APPARATUS FOR INSTALLING AND MANAGING MULTIPLE ESIM PROFILES

CROSS-REFERENCE TO RELATED APPLICATIONS

This application is based on and claims priority under 35 U.S.C. § 119 to Korean Patent Application Nos. 10-2020-0099358, 10-2020-0138646, 10-2020-0166008, 10-2021-0007619, 10-2021-0042953 & 10-2021-0065797, filed on Aug. 7, 2020, Oct. 23, 2020, Dec. 1, 2020, Jan. 19, 2021, Apr. 1, 2021 & May 21, 2021, in the Korean Intellectual Property Office, the disclosure of which is herein incorporated by reference in its entireties.

BACKGROUND

1. Field

The disclosure relates to a method and apparatus for connecting communication by downloading and installing one or more communication services in a terminal in a wireless communication system. In addition, the disclosure relates to a method and apparatus for remotely downloading and installing a profile in a terminal, and managing a plurality of installed profiles.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A universal integrated circuit card (UICC) is a smart card which is used via insertion to a mobile communication terminal or the like, and is also referred to as a UICC card. The UICC may include an access control module for accessing the network of a mobile communication operator. Examples of the access control module may include a universal subscriber identity module (USIM), a subscriber identity module (SIM), an IP multimedia service identity module (ISIM), and the like. A UICC including a USIM is commonly referred to as a USIM card. In the same manner, a UICC including a SIM is generally referred to as a SIM card. In the following description, the term "SIM card" is used as a general meaning including a UICC card, a USIM card, a UICC including an ISIM, and the like. That is, although the description is provided by taking a SIM card as an example, the technical application thereof may be equally applicable to a USIM card, an ISIM card, or a general UICC card.

The SIM card stores personal information associated with a mobile communication subscriber, and performs authentication of a subscriber and production of a traffic security key when accessing a mobile communication network, thereby enabling the safe use of mobile communication.

The SIM card is manufactured as a dedicated card of a specific mobile communication operator when being manufactured by request of the corresponding operator. When the SIM card is released, authentication information for accessing the network of the corresponding operator, for example, a universal subscriber identity module (USIM) application, international mobile subscriber identity (IMSI), a K value, an OPc value, and the like are contained in advance in the card. Therefore, the corresponding mobile communication operator is supplied with the manufactured SIM card and provides the same to a subscriber. Later on, the SIM card may perform management such as installation, correction, deletion of an application in the UICC using a technology such as over-the-air (OTA) or the like, if needed. A subscriber inserts the UICC card into his or her mobile communication terminal, and uses the network and application services of the corresponding mobile communication operator. If the subscriber inserts, to a new terminal, the UICC card which has been inserted into the existing terminal, the subscriber is capable of using authentication information, a mobile communication phone number, personal telephone book, and the like stored in the UICC card, as they are.

However, in the case of the SIM card, the user of the mobile communication terminal may have difficulty in receiving a service of another mobile communication operator. The user of the mobile communication terminal needs to physically obtain a SIM card to receive a service from a mobile communication operator. For example, if the user travels another country, the user needs to have a SIM card of the country in order to receive a local mobile communication service, which is an inconvenience. The use of a roaming service may solve the inconvenience. However, costs may be high or the service may not be provided if there is no contract between communication operators.

If a SIM module is remotely downloaded and installed in the UICC card, the inconvenience may be mostly dismissed. That is, the user is capable of downloading, in the UICC card, the SIM module of a mobile communication service that the user desires to use at the point in time at which the user desires to use. The UICC card may download and install a plurality of SIM modules and may select and use one of the SIM modules. The UICC card may be or may not be fixed to a terminal. Particularly, a UICC which is used in the manner of being fixed to a terminal is referred to as an embedded UICC (eUICC). Generally, an eUICC is a UICC card which is used in the manner of being fixed to a terminal, and is capable of remotely downloading and selecting a SIM module. In the disclosure, a UICC card that is capable of remotely downloading and selecting a SIM module is commonly referred to as an eUICC. That is, among UICC cards that are capable of remotely downloading and selecting a SIM module, a UICC card that is fixed to a terminal and a UICC card that is not fixed to a terminal are commonly referred to as an eUICC. In addition, SIM module information obtained via downloading is referred to as the term "profile."

Although one or more profiles are present in the eUICC, only one profile is capable of being enabled at the same time. Therefore, although a terminal supports two baseband(s) and two or more profiles are present in the corresponding eUICC, the terminal is incapable of supporting a dual SIM function which enables simultaneous use of two profiles in a single mobile phone. The drawback may be overcome by including two eUICC(s) in the terminal, but an eUICC module needs to be included additionally and a physical interface may be needed for connecting the eUICC module to a baseband of a modem. Accordingly, the manufacturer of the terminal needs to bear expenses associated with purchasing the additional eUICC module and a physical pin for the physical interface. In addition, the space for containing the corresponding module and physical pin need to be secured in the terminal.

The above information is presented as background information only to assist with an understanding of the disclosure. No determination has been made, and no assertion is made, as to whether any of the above might be applicable as prior art with regard to the disclosure.

SUMMARY

If an MEP supporting terminal desires to enable a profile installed in an eUICC via local profile enabling by a user or via remote enabling by a profile server, simultaneous enabling of one or more profiles need to be performed by additionally obtaining and combining predetermined information, such as the number of profiles capable of being enabled at the same time, which is provided by the UE, a baseband combination supportable by a modem, whether a corresponding baseband is occupied and used by a profile, and the like.

Currently, only one eSIM profile can be enabled at the same time in an existing eUICC. Accordingly, if profile 2 connected to a network is present when profile 1 is desired to be enabled, profile 2 may be disabled and the communication connection of the profile 2 may be disconnected, which is a drawback.

The eUICC is connected to a single baseband of a modem via a single physical interface, and thus, a message associated with eUICC memory resetting and a message associated with profile disabling are not separately processed. However, in the case of an MEP allowed terminal, if the message associated with eUICC memory resetting and the message associated with profile disabling are not separately processed, a modem may delete all cached data including the cached data of profile 2 which has been stored in the modem, which is a drawback that needs to be overcome.

The subject matter of the disclosure is to provide a method and apparatus for installing, enabling, and managing a plurality of profiles, so as to provide a dual SIM function even in a terminal equipped with a single eUICC in a communication system.

In an embodiment, a method performed by a terminal in a wireless communication system is provided. The method includes identifying, by a local profile assistant (LPA), information associated with a target profile required to be enabled; sending, by the LPA to an embedded universal integrated circuit card (eUICC), a first message to enable the target profile, the first message including a refresh flag and a port number corresponding to the target profile; in case that the refresh flag is set in the first message, receiving, by a modem from the eUICC, a second message to initiate a status refresh of the modem including the port number; and in case that the refresh flag is not set in the first message, receiving, by the modem from the LPA, the port number.

In an embodiment, a method performed by an embedded universal integrated circuit card (eUICC) in a wireless communication system is provided. The method includes receiving, from a local profile assistant (LPA) of a terminal, a first message to enable a target profile, the first message including a refresh flag and a port number corresponding to the target profile; identifying whether the refresh flag is set in the first message; and in case that the refresh flag is set in the first message, sending, to a modem of the terminal, a second message to initiate a status refresh of the modem including the port number.

In an embodiment, a terminal in a wireless communication system is provided. The terminal includes a local profile assistant (LPA) and a modem. The LPA is configured to identify information associated with a target profile required to be enabled, and send, to an embedded universal integrated circuit card (eUICC), a first message to enable the target profile, the first message including a refresh flag and a port number corresponding to the target profile. The modem is configured to in case that the refresh flag is set in the first message, receive, from the eUICC, a second message to initiate a status refresh of the modem including the port number, and in case that the refresh flag is not set in the first message, receive, from the LPA, the port number.

In an embodiment, an embedded universal integrated circuit card (eUICC) in a wireless communication system is provided. The UICC is configured to receive, from a local profile assistant (LPA) of a terminal, a first message to enable a target profile, the first message including a refresh flag and a port number corresponding to the target profile;

identify whether the refresh flag is set in the first message; and in case that the refresh flag is set in the first message, send, to a modem of the terminal, a second message to initiate a status refresh of the modem including the port number.

In accordance with an aspect of the disclosure, there is provided a method of a terminal in a wireless communication system. The method may include: transmitting, to a manager server, an authentication request message including port identity information; receiving, from the manager server, an authentication response message including profile information for management and port information for management which are produced based on the port identity information; and performing profile management based on the profile information for management and information associated with a port to be mapped to a profile to be managed.

In accordance with another aspect of the disclosure, there is provided a terminal in a wireless communication system. The terminal may include: a transceiver configured to transmit or receive a signal; an embedded universal integrated circuit card (eUICC) configured to manage a profile; and a controller configured to perform control so as to: transmit an authentication request message including port identity information to a manager server; receive, from the manager server, an authentication response message including profile information for management and port information for management which are produced based on the port identity information; and perform profile management based on the profile information for management and information associated with a port to be mapped to a profile to be managed.

Particularly, in order to achieve the above, the disclosure includes the following embodiments.

A method in which a terminal reports "eSIM port Capability" information of the terminal to a profile server.

A method in which a profile server identifies "eSIM port Capability" information, and remotely selects a profile to enable and selects an eSIM port on which the profile is to be enabled.

A method of providing a screen for determining a port to be used in consideration of the profile enabled state of an eUICC and "eSIM port Capability" to a user of a terminal, and enabling the terminal to determine an eSIM port to be used by a profile.

A method in which an LPA of a terminal transmits corresponding eSIM port information to an eUICC.

A method in which an eUICC receives corresponding port information and enables a profile on the corresponding port.

In addition, in order to achieve the above, the disclosure includes the following embodiments.

A method in which, if an eUICC receives a message associated with eUICC memory reset request or a profile state change request from an LPA of a terminal in an MEP mode, the eUICC distinguishes a message for refreshing associated with a state change in the eUICC and transmits the same to the LPA of the terminal or a modem according to the message received from the LPA of the terminal.

A method in which a modem that receives a corresponding message directly from an eUICC or via an LPA operates differently depending on the received message and a port number included in the received message.

The technical subject matter of the disclosure is not limited to the above-mentioned technical subject matters, and other technical subject matters which are not mentioned may be understood by those skilled in the art based on the following description.

According to embodiments of the disclosure, a user is capable of using a dual SIM function in a terminal equipped with a single eUICC. In addition, a terminal manufacturer may provide a dual SIM function without an additional containing space by connecting a single eUICC and a single physical pin to a modem (providing two or more basebands). An additional eUICC does not need to be employed, and thus, costs for production may be saved.

A profile management server may obtain information associated with an eSIM port of an MEP terminal, on which a profile is to be enabled, and may request a corresponding terminal to enable the profile on an optimal port. Profile 1 and profile 2 which are simultaneously enabled in an eUICC may operate within the single eUICC without mutual interference (termination of network access of profile 2 due to enabling of profile 1 or the like), and thus, the communication operators of profile 1 or profile 2 may reliably provide network services.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
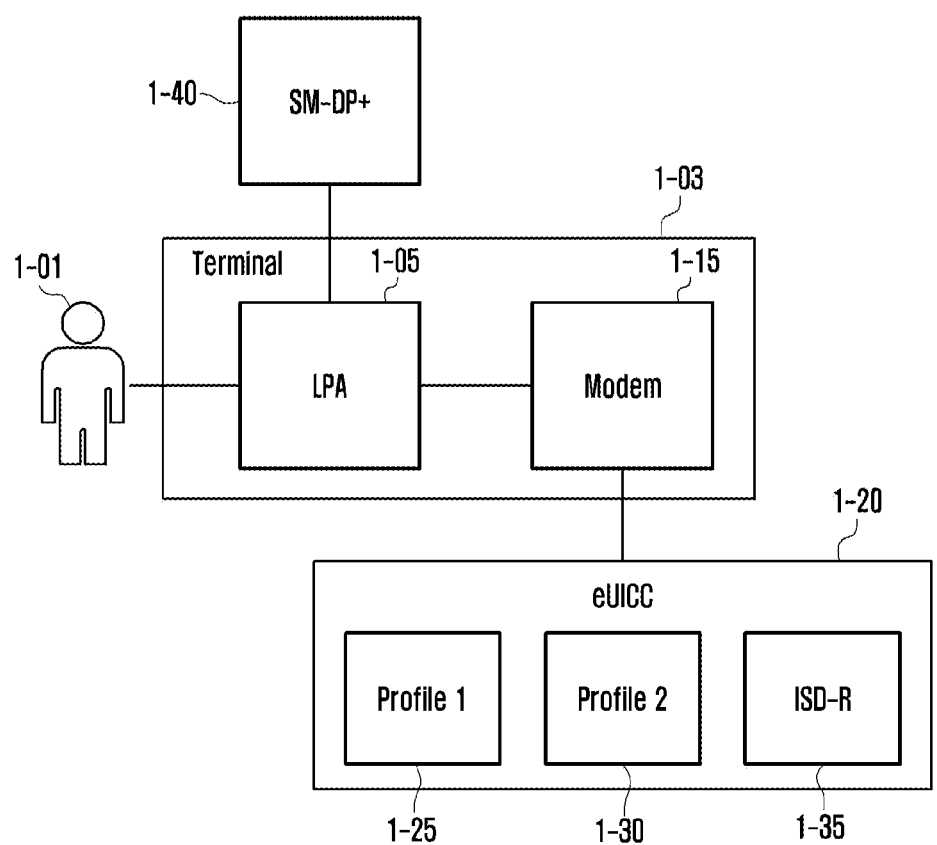
FIG. 1 is a diagram illustrating the structural elements of the disclosure in a wireless communication system according to an embodiment.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the present disclosure. For the same reason, in the accompanying drawings, some elements may be exaggerated, omitted, or schematically illustrated. Further, the size of each element does not completely reflect the actual size. In the drawings, identical or corresponding elements are provided with identical reference numerals. The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the present disclosure, the same or like reference numerals designate the same or like elements. Further, in the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the present disclosure.

Hereinafter, a base station is a subject of performing resource allocation with respect to a terminal, and may be at least one of a gNode B, an eNode B, a Node B, a base station (BS), a wireless access unit, a base station controller, or a node on a network. A terminal may include a user equipment (UE), a mobile station (MS), a cellular phone, a smart phone, a computer, or a multimedia system capable of performing a communication function. In the disclosure, a downlink (DL) is a wireless transmission path of a signal that a base station transmits to a terminal. An uplink is a wireless transmission path of a signal that a terminal transmits to a base station. In addition, although an embodiment of the disclosure is described with reference to an LTE or LTE-A system, the embodiment of the disclosure may be applicable to other communication systems that have a similar technical background or use a similar channel type. For example, a 5G mobile communication technology (5G, new radio, NR) which is developed after LTE-A may be included in a system to which an embodiment of the disclosure is applied. Hereinafter, 5G may be a concept including legacy LTE, LTE-A, and other similar services. In addition, the disclosure may be modified by those skilled in the art without departing from the scope of the disclosure, and may be applied to other communication systems. Here, it will be understood that each block of the flowchart illustrations, and combinations of blocks in the flowchart illustrations, can be implemented by computer program instructions.

These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved. As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

First, terms used in the present disclosure will be defiled.

In the present disclosure, a UICC is a smart card which is used by being inserted into a mobile communication terminal. The UICC may be a chip that stores personal information such as the network access authentication information, a phone book, and SMS in association with a mobile communication subscriber, and performs subscriber authentication and traffic security key production when accessing a mobile communication network such as GSM, WCDMA, LTE, 5G, and the like, in order to support the safe use of mobile communication. The UICC may include a communication application, such as a subscriber identification module (SIM), a universal SIM (USIM), an IP multimedia SIM (ISIM), and the like, depending on the type of mobile communication network that the subscriber accesses, or may provide a high level of security function for loading various applications such as an electric wallet, a ticketing application, an electric passport, and the like.

In the present disclosure, an embedded UICC (eUICC) is a secure module which is embedded in a terminal, as opposed to a removable secure module which is capable of being inserted into or detachable from the terminal. The eUICC may download a profile using over-the-air (OTA) technology, and may install the same. The eUICC may be referred to as a UICC that is capable of downloading and installing a profile.

The method of downloading a profile using the OTA technology and installing the same in the eUICC according to the disclosure may be applicable to a removable UICC which is capable of being inserted into and detached from a terminal. For example, embodiments of the disclosure may be applicable to a UICC that is capable of downloading a profile via the OTA and installing the same.

The term "UICC" in this present disclosure may be used interchangeably with the term "SIM," and the term "eUICC" may be used interchangeably with the term "eSIM." In the present disclosure, the term "eUICC" may be used interchangeably with the term "UICC," and the term "UICC" may be used as a concept including "eUICC." The UICC is a type of secure element (SE), and the term "UICC" may be interchangeably used with "SE."

In the present disclosure, a profile may be a thing in which an application, a file system, an authentication key value, and the like, stored in a UICC, are packaged in a software format. In addition, a profile is also referred to as access information.

A USIM profile in this present disclosure may have the same meaning as that of a profile, or may be a thing in which information incorporated in a USIM application of a profile is packaged in a software format.

In the present disclosure, a profile server is a server that may provide a function of producing a profile, encrypting the produced profile, producing a remote profile management command, or encrypting the produced remote profile management command, or may include a function of supporting multiple profile enabling of a terminal. The profile server may be referred to as a subscription manager data preparation (SM-DP), subscription manager data preparation plus (SM-DP+), or subscription manager secure routing (SM-SR).

In the present disclosure, the term "terminal" or "device" may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various examples of a terminal may include a cellular phone, a smart phone having a wireless communication function, a personal digital assistant (PDA) having a wireless communication device, a wireless modem, a portable computer having a wireless communication function, a photographing device, such as a digital camera having a wireless communication function, a gaming device having a wireless communication function, electric appliance for storing and reproducing music, which has a wireless communication function, Internet electric appliance capable of accessing and browsing the Internet in a wireless manner, and portable units or terminals which include combinations of the functions. Furthermore, a terminal may include a machine to machine (M2M) terminal and a machine type communication (MTC) terminal/device, but is not limited thereto. In the present disclosure, a terminal may be referred to as an electronic device, or may be simply referred to as a device. In addition, a terminal in the present disclosure may be interchangeably used with a modem.

In the present disclosure, a terminal or a device may include software or an application which is installed in the terminal or device so as to control a UICC or eUICC. The software or application may be referred to as, for example, a local profile assistant (LPA). In the present disclosure, an eUICC identifier (eUICC ID) may be the unique identifier of an eUICC embedded in a terminal, and may be referred to as an EID.

In the present disclosure, an application protocol data unit (APDU) may be a message used for interoperation between a controller in a terminal or device and an eUICC.

In the present disclosure, a profile package may be interchangeably used with a profile, or may be used as a term that refers to the data object of a specific profile. The profile package may be referred to as a profile TLV or a profile package TLV. A profile identifier may be the unique identifier number of a profile, and may be referred to as an ICCID. If a profile package is encrypted using an encryption parameter, the encrypted profile package may be referred to as a protected profile package (PPP) or a protected profile package TLV (PPP TLV). If a profile package is encrypted using an encryption parameter which is decrypted only using a specific eUICC, the encrypted profile package may be referred to as a bound profile package (BPP) or a bound profile package TLV (BPP TLV). A profile package TLV may be a data set expressing information of a profile in the form of TLV (tag, length, value).

In the present disclosure, "AKA" denotes an authentication and key agreement, and may be an authentication algorithm for accessing a 3GPP network and a 3GPP2 network. K denotes an encryption key value which is used for an AKA authentication algorithm and is stored in an eUICC. In the present disclosure, OPc is a parameter value which is used for AKA authentication algorithm, and may be stored in an eUICC.

In the present disclosure, "NAA" is a network access application, and may be an application program which is stored in a UICC and is used for accessing a network, such as a USIM or an ISIM. An NAA may be a network access module.

In the present disclosure, an end user, a user, a subscriber, a service subscriber, and a user may be interchangeably used with a user of a corresponding terminal.

In the present disclosure, an eSIM port may be a virtual interface channel that shares a physical interface connected between an eUICC and a modem by multiplexing the physical interface. The eSIM port may be interchangeably used with an eSIM port, a port, and a SIM port.

In the present disclosure, a function of enabling and managing a plurality of profiles included in a single eUICC may be commonly referred to as a multiple enabled profile (MEP) function. A legacy eUICC is capable of enabling only one profile at the maximum, and thus, a dual SIM function or multi-SIM function may not be supported by a single eUICC. In order to support a dual SIM function or multi-SIM function using a single eUICC, the single eUICC needs a function of enabling and managing multiple profiles. An eUICC in which an MEP function is implemented may be referred to as an MEP supporting eUICC. A terminal including a modem in which an MEP function is implemented and terminal software capable of supporting the same may be referred to as an MEP supporting terminal.

Further, in the following description of the disclosure, a detailed description of known functions and configurations incorporated herein will be omitted when it may make the subject matter of the disclosure rather unclear.

Hereinafter, embodiments suggested will be described with reference to drawings.

FIG. 1 is a diagram illustrating the structural elements of the disclosure in a wireless communication system according to an embodiment.

A user 1-01 may request installing/enabling/disabling/updating of a profile in an eUICC 1-20 using an LPA 1-05 of a terminal 1-03 or a terminal application in which the LPA 1-05 is implemented, or may provide permission of the user for remote profile management (RPM) processing transferred from an SM-DP+ 1-40.

The remote profile management (RPM) is a series of processes in which a profile is installed/enabled/disabled/deleted, and other functions is performed on the profile according to a command transmitted from the SM-DP+ 1-40 to the terminal. RPM may be requested by a communication operator, a service provider, or an owner of a terminal, and a command may be produced by the SM-DP+ 1-40. The LPA 1-05 that receives a user input associated with a request for or permission of management of the corresponding profile may manage or control operation of the eUICC 1-20 by transmitting a message to the eUICC 1-20 according to the user input.

A communication modem 1-15 of the terminal is a device that modulates and transmits a signal for transmitting information, and decodes a modulated signal to an original signal at a reception side. In the case of an MEP supporting modem, two or more baseband processors (hereinafter, basebands) for wireless communication may be contained. The modem 1-15 is connected to an eUICC and a single physical pin (applying a smart card interface of the ISO7816 standard at the point in time at which the disclosure is provided), and if the modem transmits an application protocol data unit (APDU) command via the corresponding interface, the eUICC 1-20 sends a result value as a response.

If the eUICC 1-20 has a message to transmit to the modem 1-15, the eUICC 1-20 may send (transmit) a response code (e.g., SW1(Status word)=91, SW2=XX)) indicating that the eUICC 1-20 has a message to transmit as a response to an APDU command transmitted from the modem 1-15. Through the above, the eUICC 1-20 may inform the modem 1-15 of the same so that the modem 1-15 is capable of receiving a "message that the eUICC 1-20 is to transmit to the modem 1-15" via a basic channel.

The modem 1-15 transmits FETCH Command APDU to the eUICC 1-20 via the basic channel, and the eUICC 1-20 may transmit Response APDU in response thereto. In this instance, the message that the eUICC is to transmit, for example, a proactive command may be included in a data part, and may be transmitted. The proactive command may be a request for UICC resetting or profile state changing. Further descriptions thereof will be described in detail with reference to FIGS. 4A to 4C and FIGS. 8A and 8B.

The LPA 1-05 may be software that operates on a terminal platform, and the function of the LPA may be partially incorporated in the terminal platform. The message that the LPA 1-05 transmits to the eUICC 1-20 may be finally transmitted to the eUICC 1-20 via the terminal platform or via the terminal platform and the modem 1-15, and the eUICC 1-20 that receives the corresponding message may perform profile management according to the command transmitted from the LPA.

Although FIG. 1 is illustrated under the assumption that two profiles, profile 1 and profile 2, are present in the eUICC 1-20 for ease of description, it is not limited thereto and it may be construed that the eUICC 1-20 includes more profiles depending on the capability of the memory of the eUICC 1-20. In an MEP supporting eUICC, profile 1 1-25 and profile 2 1-30 may be enabled simultaneously. In the case of an MEP-non-supporting eUICC, one of the profile 1 1-25 or the profile 2 1-30 may be enabled.

An issuer security domain root (ISD-R) 1-35 may produce a new issuer security domain profile (ISD-P) (e.g., security domain for hosting a profile), and may provide, to the LPA, eUICC data and service (e.g., local profile management and metadata information of a profile) required by an LPA function.

Although not illustrated for ease of description, the eUICC 1-20 in the drawing may include an embedded UICC controlling authority security domain (ECASD) which is a space for storing credentials required by the security domains of the eUICC, for example, a certificate issuer's root public key for verifying an SM-DP+ authentication certificate, a keyset of an eUICC manufacturer or the like, an eSIM platform, and the like.

The SM-DP+ server 1-40 is a profile server. As described above, the profile server may be a server including a function of producing a profile, encrypting the produced profile, producing a remote profile management command, or encrypting the produced remote profile management command, or may be a server including a function of supporting multiple profile enabling of a terminal. The LPA 1-05 of the terminal 1-03 receives an SM-DP+ remote management command from the SM-DP+ server 1-40, obtains user consent via interaction with the user 1-01, and transfers the corresponding remote management command to the eUICC 1-20, so as to process enabling/disabling/deleting/updating.

The eUICC 1-20 may be provided in the form of being fixed to the terminal or in the form of being detachable. In consideration of the form of being fixed to the terminal, the eUICC 1-20 may be illustrated as one of the entities of the terminal 1-03. However, the eUICC is illustrated as a separate entity in order to include the case of the detachable eUICC 1-20 in the disclosure.

Figure 2A:
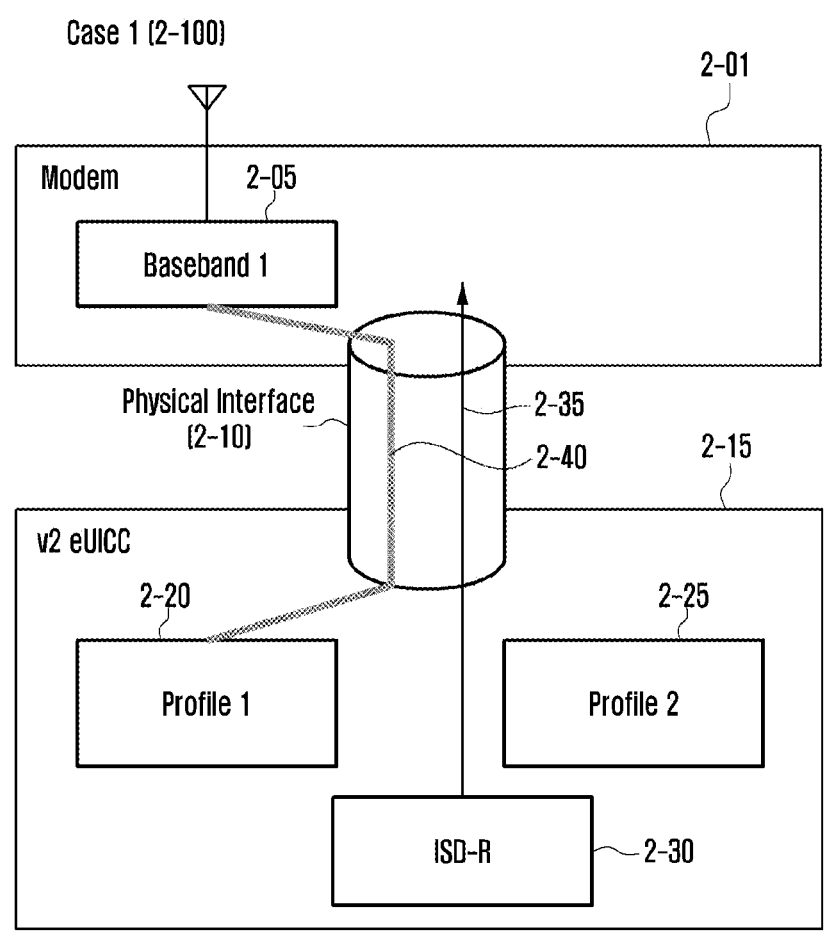
FIG. 2A is a diagram illustrating a connection (case 1) between a modem and a current v2 eUICC that does not support MEP.
Figure 2B:
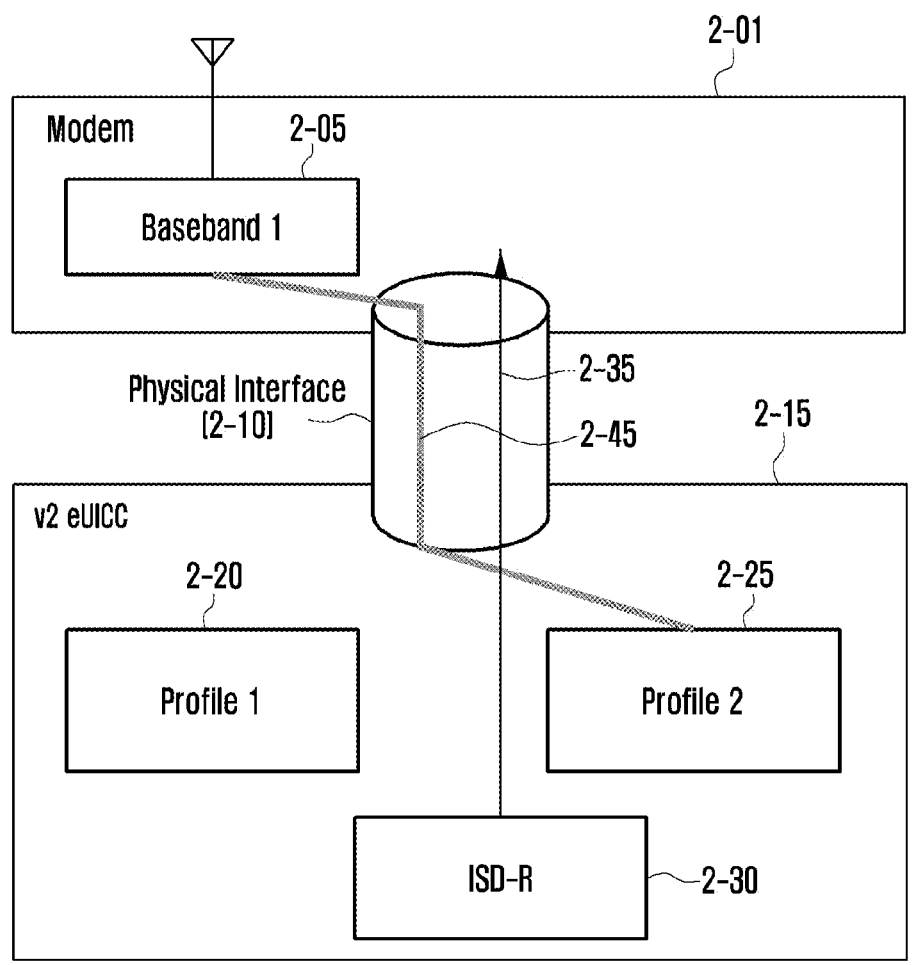
FIG. 2B is a diagram illustrating a connection (case 2) between a modem and a current v2 eUICC that does not support MEP.

FIGS. 2A and 2B are diagrams illustrating examples of the connection between a modem and a current v2 eUICC that does not support MEP.

In the current v2 eUICC, only single (one) profile may be enabled in the eUICC, and only local profile management by a user without intervention of an SM-DP+ may be allowed to process enabling/disabling/deleting/updating and the like of a previously installed profile. An MEP-non-supporting modem 2-01 may include one or more basebands if a physical SIM card is used together with an eUICC. However, in the disclosure, description is provided under the assumption that one baseband is used.

In an initialization procedure (initialization between a terminal and a card) among a terminal platform-modem-eUICC, the terminal may produce a channel for an APDU for transmitting data between the modem and the eUICC at a specific point in time after receiving an answer to reset (ATR) from the eUICC.

In the v2 eUICC 2-15, only one profile may be enabled at the same time.

Case 1 2-100 of FIG. 2A is the case in which profile 1 2-20 is enabled and profile 2 2-25 is disabled. Case 2 2-200 of FIG. 2B is the case in which profile 1 2-20 is disabled and profile 2 2-25 is enabled. According to case 1 2-100, if the single enabled profile needs to transmit an APDU to the baseband of the modem, the eUICC 2-15 transmits the corresponding APDU via a single channel of a physical interface 2-10 connected to the modem 2-01.

If an ISD-R 2-30 receives a ES10c.EnableProfile(Profile2) request for profile state changing, for example, state changing from case 1 2-100 to case 2 2-200, from the LPA, the ISD-R 2-30 may transmit, to the modem 2-10, an APDU for deleting the previously cached data of the profile and restarting an application session, as a REFRESH proactive command.

In addition, if the ISD-R 2-30 receives a request for eUICC memory resetting from the LPA, the ISD-R 2-30 may transmit, to the modem 2-10, an APDU for deleting the previously cached data of the UICC and for restarting an application session, as a REFRESH proactive command. The APDU that the ISD-R 2-30 transmits to the modem 2-01 may also be transmitted via a single channel of the physical interface 2-10.

Figure 3A:
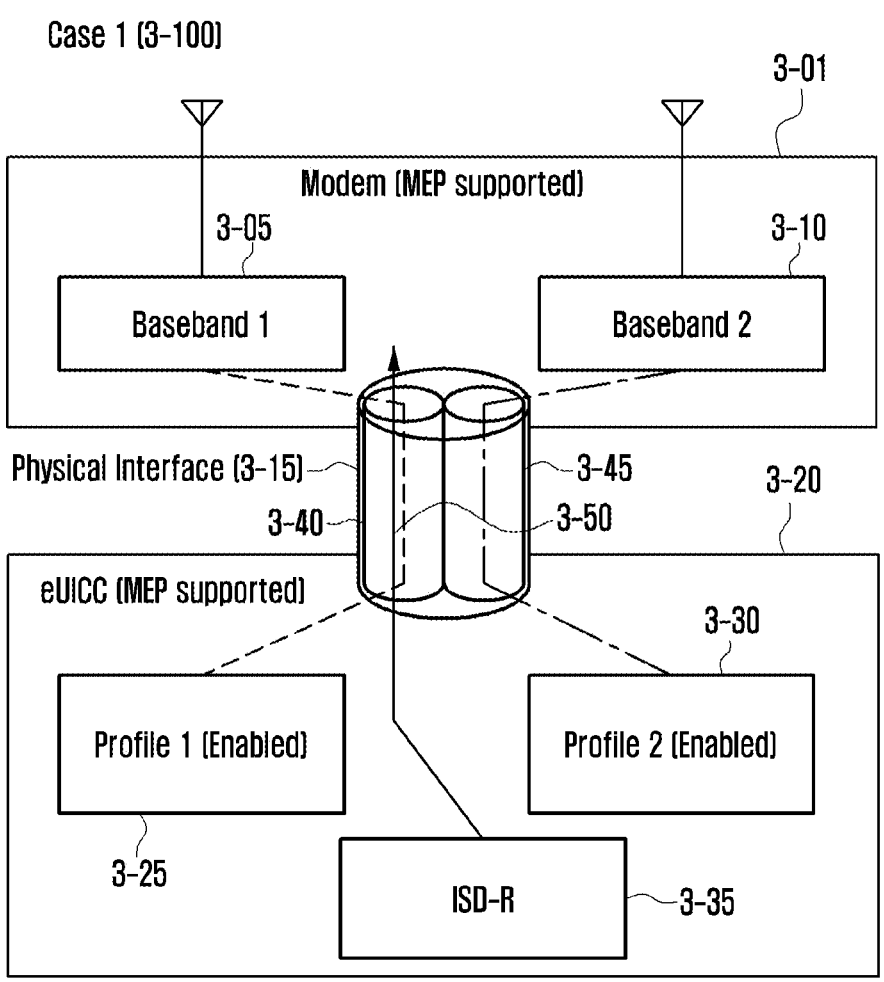
FIG. 3A is a diagram illustrating a connection (case 1) between a modem and a v3 eUICC in accordance with introduction of the concept of a virtual interface.
Figure 3B:
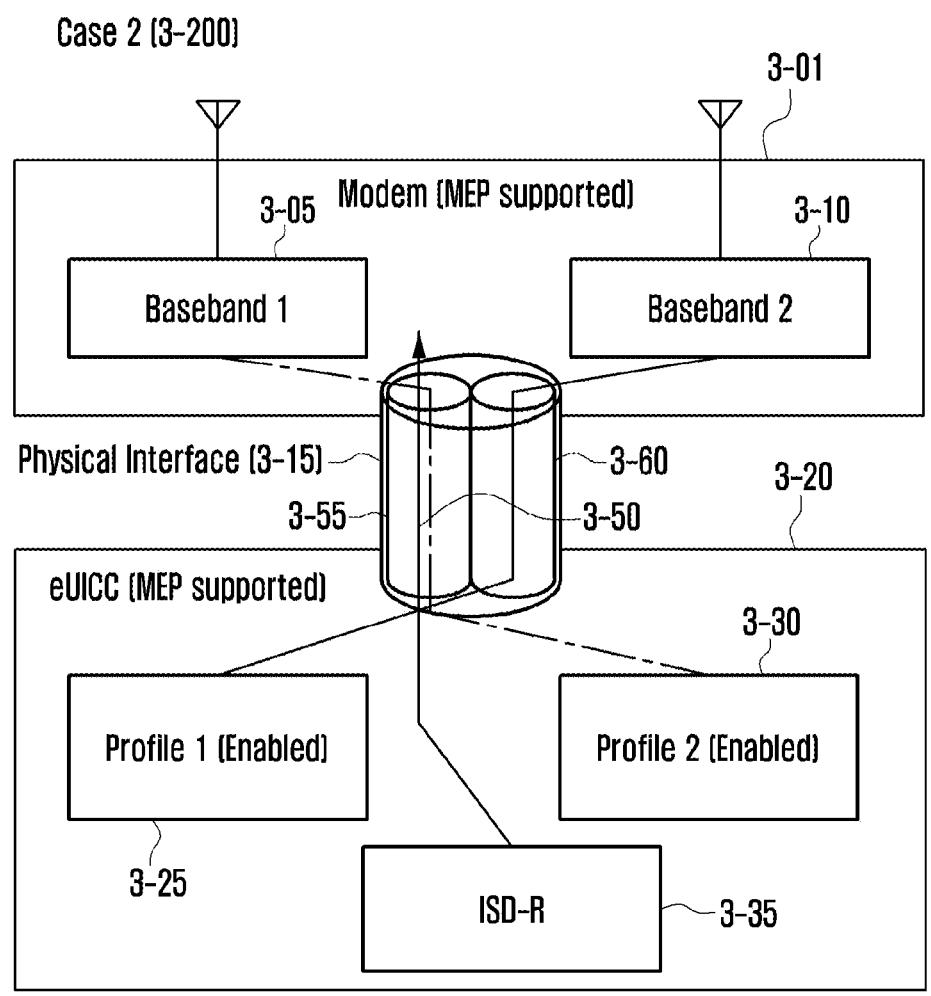
FIG. 3B is a diagram illustrating a connection (case 2) between a modem and a v3 eUICC in accordance with introduction of the concept of a virtual interface.

FIGS. 3A and 3B are diagrams illustrating examples of the connection between a modem and a v3 eUICC in accordance with introduction of the concept of a virtual interface.

FIGS. 3A and 3B assume that an eUICC 3-20 is an eUICC that supports an MEP function that is capable of simultaneously enabling multiple profiles. In addition, it is assumed that a modem 3-01 is a modem that supports the MEP function. FIGS. 3A and 3B provide description by taking an example in which two basebands and two enabled profiles are present. Although mapping switching between the basebands in the modem 3-01 and eSIM ports are possible, case 1 and case 2 describe logical terminal endpoint mapping in the modem 3-01 by taking baseband 1 3-05-channel 1 1-40 and baseband 2 3-10-channel 2 1-45 as an example.

As described in FIGS. 2A and 2B, the current modem 1-15 is connected to an eUICC 1-20 via a single physical pin, and the corresponding modem and the eUICC may transmit an APDU command via the single channel 2-10 using the corresponding physical pin. The eUICC 3-20 that supports MEP may enable multiple profiles, and the enabled profile may need to perform APDU transmission with a baseband of the modem. Therefore, to process the same, a concept of multiplexing the physical interface 3-15 and separately transmitting APDUs via many channels 3-40 and 3-45 may be employed.

Hereinafter, for ease of description, if MEP is supported, a channel is referred to as an eSIM port. Channels are referred to as eSIM ports, for example an eSIM port 1 3-40 and an eSIM port 2 3-45, respectively. After UICC Reset or Profile Status Change, the terminal may produce an APDU channel for transmission between the modem baseband-eUICC in the initialization process among the terminal platform-modem-eUICC. In this instance, the terminal may set an ID for an eSIM port connected to each baseband. The corresponding port ID may be set in the modem or terminal platform and may be transferred to the LPA. In the present disclosure, the port ID may be interchangeably used with a port number for ease of description.

The modem may include as many eSIM ports as the number of basebands. However, the number of eSIM ports utilized by the eUICC 3-20 may be less than or equal to the number of profiles capable of being enabled simultaneously in the corresponding eUICC. A profile may transmit an APDU message using one of the eSIM ports.

According to case 1 3-100 of FIG. 3A, an APDU command corresponding to enabled profile 1 3-25 may be transmitted to baseband 1 3-05 via eSIM port 1 3-40, and simultaneously, an APDU command corresponding to enabled profile 2 3-30 may be transmitted to baseband 2 3-10 via eSIM port 2 3-45.

According to case 2 3-200 of FIG. 3B, an APDU command corresponding to the enabled profile 1 3-25 may be transmitted to the baseband 2 3-10 via the eSIM port 2 3-60, and simultaneously, an APDU command corresponding to the enabled profile 2 3-30 may be transmitted to the baseband 1 3-05 via the eSIM port 2 3-55.

The MEP supporting modem 3-01 may differently process an APDU command transmitted via each eSIM port by identifying a baseband the corresponding APDU command is to be connected. An ISD-R 3-35 may need to transmit an APDU command 3-50 to the modem in order to manage the state of a profile and an eUICC. In this instance, an ISD-R 3-35 may perform transmission via two schemes.

1) Multi-selected scheme: an LPA or modem may determine to select the ISD-R 3-35 via multiple eSIM ports in an initialization process between an eUICC and a terminal-card, or may operate to select the ISD-R 3-35 using multiple eSIM ports according to a setting between the terminal and the card. This is referred to as a multi-selected scheme. In the multi-selected scheme, the LPA or modem may transmit a command APDU (command message) to the ISD-R 3-35 or may transmit a command APDU for identifying whether the ISD-R 3-35 has an event to process or an APDU to transmit, via one of the selected eSIM ports. The ISD-R 3-35 may select a corresponding eSIM port depending on whether a command message received from the LPA or modem is a management message corresponding to profile 1 3-25 or profile 2 3-30, a management message corresponding to profile 1 3-25 and profile 2 3-30, or a message associated with the entire eUICC, and may send an APDU including a proactive command via the selected port as a response. Alternatively, even in the case of an ISD-R of Multi-Selected scheme, the ISD-R may transmit a management message corresponding to profile 1 3-25 and profile 2 3-30 or a message associated with the entire eUICC via an eSIM port that the LPA or modem selects for command message transmission. Examples of a multi-selected scheme are illustrated additionally in FIG. 9A and FIG. 9B.

2) Non multi-selected scheme: the LPA or modem may determine to select the ISD-R 3-35 via only a single eSIM port in an initialization process between an eUICC and a terminal-card, or may operate to select the ISD-R 3-35 using a single eSIM port according to a setting between the terminal and the card. This is referred to as a Non Multi-Selected scheme. In the case of Non Multi-Selected scheme, an APDU may be transmitted or received between the terminal and the ISD-R 3-35 via only the single eSIM port that is selected. The eSIM port used by the ISD-R may be identical to an eSIM port occupied by a profile, or may be an independent ISD-R dedicated eSIM port. In the case in which the ISD-R 3-35 needs to transmit a response APDU including a proactive command to the modem, if the ISD-R 3-35 transmits the response APDU to the modem 3-01 via an eSIM port selected by the ISD-R 3-35, the modem 3-01 may interpret information associated with the received response APDU and may implement a requested command.

Figure 4A:
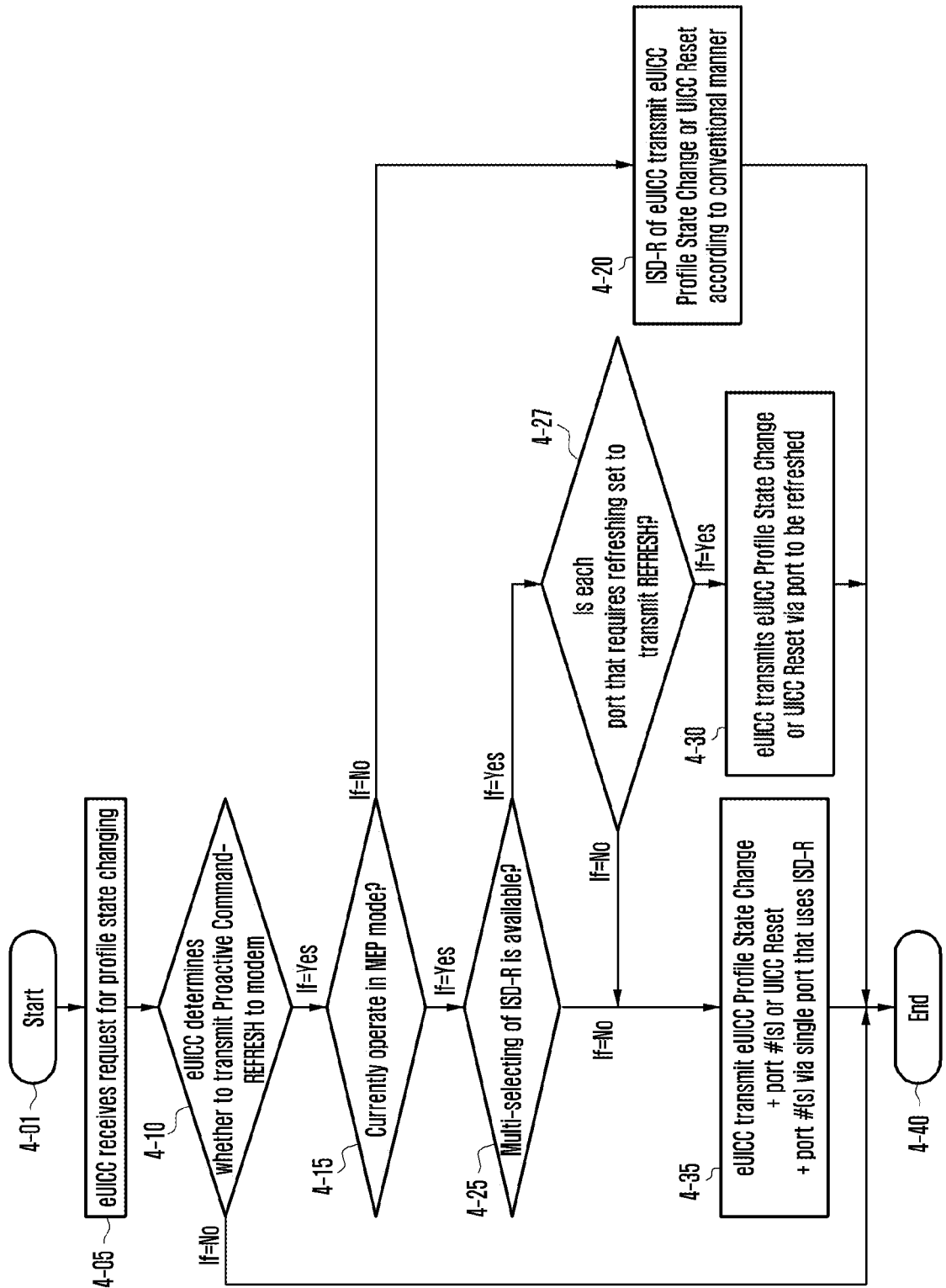
FIG. 4A is a flowchart illustrating a method in which an ISD-R of an eUICC transmits a REFRESH message for changing the state of a profile to a modem (case 1)

FIG. 4A is a flowchart illustrating a method in which an ISD-R of an eUICC transmits, to a modem, a REFRESH message (case 1) for changing the state of a profile.

Figure 4B:
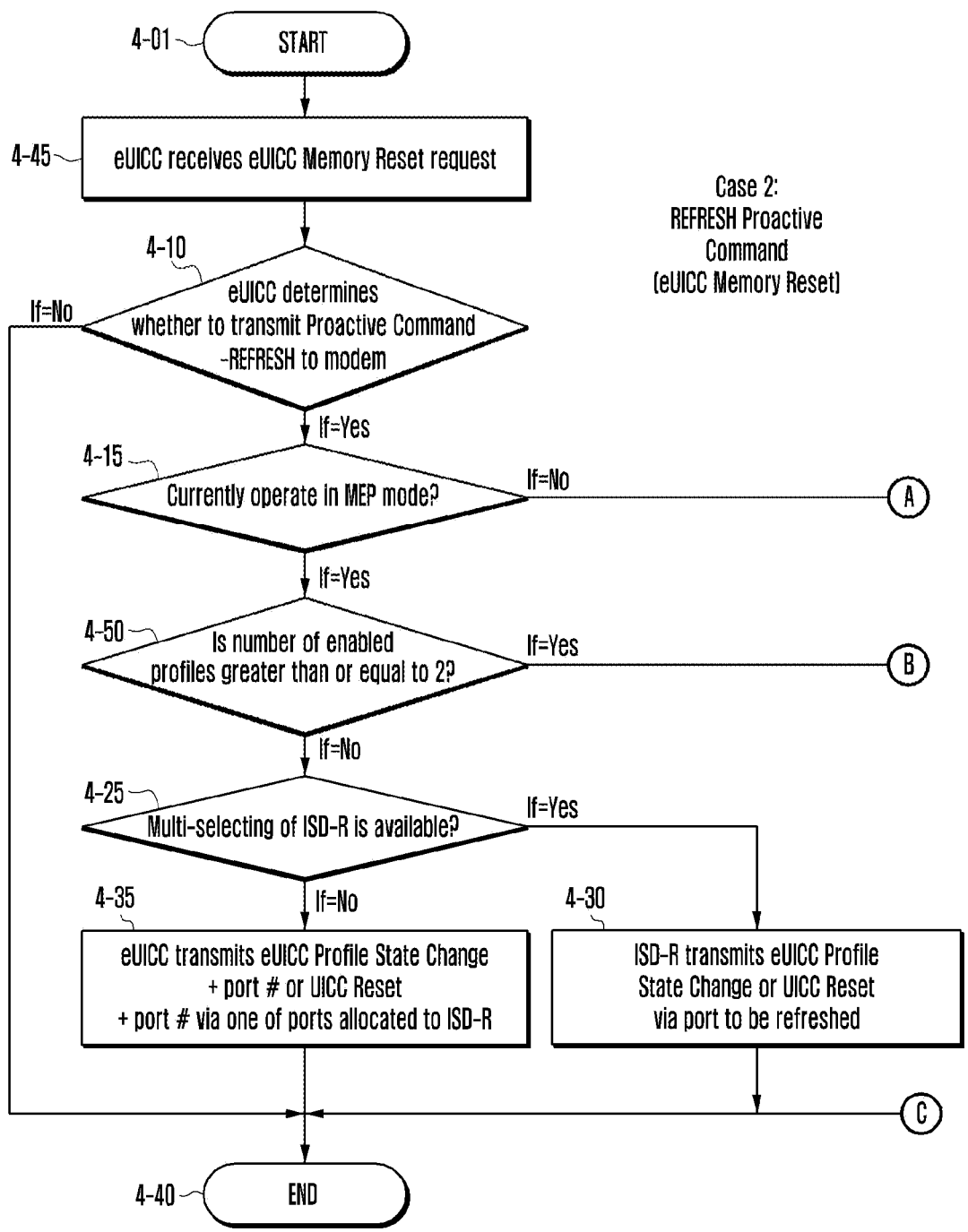
FIG. 4B is a flowchart illustrating a method in which an ISD-R of an eUICC transmits a REFRESH message for memory resetting to a modem (case 2)
Figure 4C:
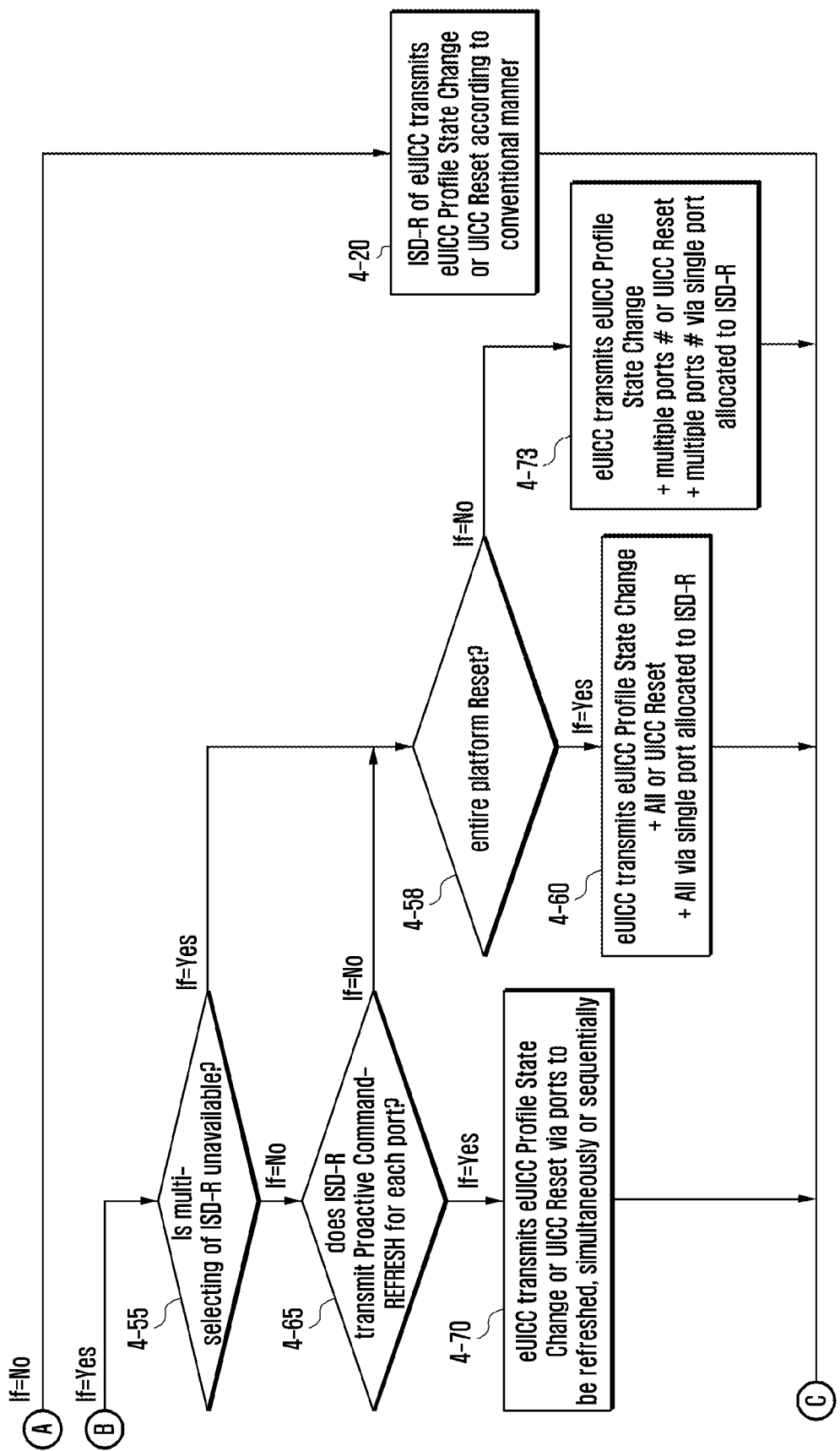
FIG. 4C is a flowchart illustrating a method in which an ISD-R of an eUICC transmits a REFRESH message for memory resetting to a modem (case 2)

FIGS. 4B and 4C illustrate a flowchart for a method in which an ISD-R of an eUICC transmits, to a modem, a REFRESH message (case 2) for memory resetting.

According to an embodiment of the disclosure, if an LPA receives, from a user of a terminal, an input for requesting state change (enabled to disabled or disabled to enabled) of a profile installed in an eUICC, the LPA may transmit an ES10c.EnableProfile message or an ES10c.DisableProfile message to the eUICC. When transmitting the corresponding message, the LPA may include refreshFlag in the message as an identifier for determining whether the eUICC needs to transmit a proactive command associated with REFRESH to the modem and may transmit the message in operation 4-05. The eUICC determines whether to transmit REFRESH to the modem based on refreshFlag in the corresponding ES10C message in operation 4-10, and if the transmission of REFRESH is needed, the eUICC may include information indicating the need of refreshing as a proactive command (a scheme of providing a response including a message that the eUICC needs to transmit in response to the message that the modem transmits to the eUICC) and transmits the same. For example, this may be a REFRESH proactive command. A message to be used as the message indicating the need of refreshing may be determined based on whether the eUICC currently operates in an MEP mode in operation 4-15 and whether multi-selecting of ISD-R is available (or whether the ISD-R is multi-selected) in operation 4-25.

In the process of establishing a connection between the terminal and the eUICC via initialization, the terminal modem may produce an eSIM port, and may transmit, to the eUICC, a command APDU associated with opening of the produced port, or may transmit, to the eUICC, a command explicitly reporting that operation is performed in the MEP mode. Alternatively, the terminal modem may identify that MEP is supported based on an answer to reset (ATR) received from the eUICC, and may transmit identification information indicating supporting of MEP to the eUICC so as to inform the eUICC that the eUICC henceforth needs to operate in the MEP mode. Whether the eUICC currently operates in the MEP mode in operation 4-15 may be determined by the eUICC based on whether the eUICC is capable of receiving and implementing a command associated with opening of an eSIM port received from the modem, whether the eUICC receives a command explicitly indicating that operation is performed in the MEP mode, or whether the eUICC supports MEP, receives identification information indicating supporting of MEP from the modem, and sets to operate in the MEP mode. Alternatively, if information associated with mapping between a profile and a port is included in profile information that the ISD-R collects or collects and stores, the eUICC may perform determination based on the corresponding mapping information. This process may be determined before the procedure begins in operation 4-01.

In the case of changing the state of a profile, a proactive command that the eUICC transmits to the modem may include the following information. The type of proactive command may be based on the ETSI TS 102. 223. A response APDU including a proactive command may be processed according to ETSI TS 102.221. As described above, if the (e)UICC has a message to transmit to the terminal, a proactive command may be included as data in a response value transmitted from the UICC in response to a FETCH command and may be transmitted. The proactive command may be expressed in the form of type-length-value (TLV), and the type and mode of a proactive command may be indicated by one data field in the value. Referring to ETSI TS. 102. 223, a proactive command may have a structure as shown in Table 1 below.

TABLE 1

| Description | Clause | M/O/C | Min | Length |
|---|---|---|---|---|
| Proactive UICC command Tag | 9.2 | M | Y | 1 |
| Length (A + B + C + . . . + N) | — | M | Y | 1 or 2 |
| Command details | 8.6 | M | Y | A |
| Device identities | 8.7 | M | Y | B |
| Value C | | | | |
| Value . . . N | | | | |

In Table 1, the "command details" field may be provided in the form of TLV as shown in Table 2 below.

TABLE 2

| Byte(s) | Description | Length |
|---|---|---|
| 1 | Command details tag | 1 |
| 2 | Length = '03' | 1 |
| 3 | Command number | 1 |
| 4 | Type of command | 1 |
| 5 | Command Qualifier | 1 |

If a proactive command including port number(s) is transmitted, a new REFRESH mode or a new proactive type (or a new type of command) (in a level equal to REFRESH) may be defined, as opposed to an existing eUICC Profile State Change or an existing UICC Reset mode.

1) If a new type of command is defined, a UICC reset value associated with a specific port or a value defining a new type for eUICC profile state changing may be present, instead of a REFRESH type. The new type for eUICC profile state changing may be a type such as "platform reset" or "port reset." Alternatively, the new type of command is defined as "reset," and "reset" may be classified based on a command qualifier of a corresponding type.

In the case of RESET (an example of a new type):
 "00"=Platform reset;
 "01"=Port reset 2) if a new mode is added as one of "REFRESH," the new mode may be expressed as a subordinate identification value of Type=REFRESH using a command qualifier such as 0B, 0C, or the like.

In the case of REFRESH:
 "00"=NAA initialization and full file change notification;
 "01"=File change notification;
 "02"=NAA initialization and file change notification;
 "03"=NAA initialization;
 "04"=UICC reset;
 "05"=NAA application reset, only applicable for a 3G platform;
 "06"=NAA session reset, only applicable for a 3G platform;
 "07"=Reserved by 3GPP ("steering of roaming" REFRESH support);
 "08"=Reserved by 3GPP (steering of roaming for I-WLAN);
 "09"=eUICC profile state change;
 "0A"=Application update;
 "0B"=Port reset
 "0C"=Platform reset In the case of defining a type of command or a new mode, a field(s) indicating a port number(s) that requires refreshing or "all" may be added as a field of value of a proactive command.

3) The port number(s) or "all" may be reported using one of the existing modes in the state in which the type of command is REFRESH, without adding a new mode. A field(s) indicating a port number(s) that requires refreshing or "all" may be added and provided as value of TLV of a proactive command, or may be reported by adding value in one TLV in value of TLV of an existing proactive command.

In the present disclosure, although an operation of using a UICC reset mode and an eUICC profile state change mode among the various modes of REFRESH is illustrated as a representative embodiment, the scope of the disclosure is not limited thereto.

The case in which the eUICC does not operate in the MEP mode:

The eUICC selects and transmits one of eUICC Profile State Change or UICC Reset according to the conventional manner. In operation 4-15, if the eUICC does not operate in the MEP mode, the case may be assumed to be the case in which the eUICC and the modem do not support MEP or the case in which the eUICC and modem support MEP but do not use a corresponding function (disabled). The case in which the eUICC and modem support MEP but do not use a corresponding function (disabled) may include the case in which two basebands are present in the modem but one eUICC occupies and uses one baseband and one SIM card occupies and uses the other baseband, respectively.

The case in which the eUICC operates in the MEP mode, and the ISD-R performs multi-selecting of eSIM ports:

In order to transmit a refresh message, the eUICC may determine to select all ports connected to a profile of which the state has been changed, as opposed to using a single ISD-R dedicated port, so that the ISD-R transmits the refresh message via each port in operation 4-27. In this instance, the ISD-R of the eUICC may select one of the eUICC profile state change mode or the UICC reset mode and may perform transmission without a port number, via a port to be refreshed, in operation 4-30. Alternatively, although the ISD-R performs multi-selecting of eSIM ports, if the ISD-R desires to transmit a message associated with refreshing to one of the ISD-R ports, the port number # of a port to be refreshed may be added to the message and may be transmitted in operation 4-35. Alternatively, if the ISD-R desires to refresh multiple ports among them, multiple port Nos. #may be transmitted.

The case in which the eUICC operates in the MEP mode, and the ISD-R does not support multi-selecting of eSIM ports:

The ISD-R of the eUICC may request refreshing of a specific port in a single transmission port in operation 4-35. The request message may be, for example, a REFRESH proactive command. A port or an eSIM port designated for selecting an ISD-R in initialization between the terminal and the eUICC may be referred to as a default port, a default eSIM port, or an ISD-R eSIM port. As described above, the ISD-R eSIM port may be an ISD-R-dedicated port independent from a port that a profile uses, or may be a port shared with the profile.

the ISD-R of the eUICC may set the mode of REFRESH to an eUICC profile state change mode and transmit the message including the port identifier of a port to which the modem needs to apply REFRESH. In this instance, a plurality of port identifiers of ports to which REFRESH is to be applied may be included and transmitted.

the ISD-R of the eUICC may set the mode of REFRESH to a UICC reset mode and transmit the message including the port identifier of a port to which the modem needs to apply REFRESH. In this instance, a plurality of port identifiers of ports to which REFRESH is to be applied may be included and transmitted.

The modem receiving the message may perform a previously defined operation according to the corresponding command, and the operation of the modem will be described in detail with reference to FIGS. 8A and 8B.

In the case in which the eUICC receives ES10c. eUICC-MemoryReset from the LPA in operation 4-45, if one or more enabled profiles are present in the eUICC, the eUICC may request REFRESH to the modem using a proactive command. In the case of eUICC memory reset, all profiles enabled for the terminal need to be disabled. Accordingly, the eUICC may transmit a REFRESH proactive command to the modem according to one of the following methods in consideration of the number of enabled profiles in addition to the determination procedure associated with REFRESH based on profile status change.

1. The case in which two or more enabled profiles are present
> A. If the ISD-R is incapable of multi-selected scheme, an operation is performed depending on whether platform reset is performed according to the setting of the eUICC.
>> i. If platform Reset is performed, the ISD-R may add an identifier (e.g., "All") indicating "all eSIM ports" when transmitting a REFRESH command of an eUICC profile state change or a UICC reset mode to the modem via a single eSIM port in operation 4-60. This may be a new REFRESH mode or a new proactive type (in a level equal to REFRESH) which is a command to implement a REFRESH command of the eUICC profile state change mode or the UICC reset mode with respect to all ports, and this may be referred to as, for example, platform Reset.
>> ii. If platform reset is not performed, the ISD-R may add an identifier indicating a plurality of eSIM port #list (e.g., #1 and #2) when transmitting a REFRESH command of the eUICC profile state change or the UICC reset mode to the modem via a single eSIM port in operation 4-73.
> B. If the ISD-R is capable of multi-selected scheme, and the ISD-R transmits proactive command-REFRESH to the modem for each port in order to implement eUICC memory reset in operation 4-65,
>> i. the ISD-R may transmit a REFRESH command of the eUICC profile state change or the UICC reset mode to the modem via two eSIM ports, simultaneously or sequentially, in operation 4-70.
> C. If the ISD-R is capable of being multi-selected, and the ISD-R transmits proactive command-REFRESH by selecting a single port in order to implement eUICC memory reset in operation 4-58,
>> i. operation 4-60 or 4-73 may be performed.
2. The case in which one profile is enabled
> A. Transmit a REFRESH command to the modem according to one of above-described operation 4-30 or 4-35

If the MEP supporting eUICC proceeds with refreshing in order to change the state of a profile as described in case 1 of FIG. 4A, the eUICC may transmit a REFRESH message in operation 4-20, 4-30, or 4-35 according to the situation, and may receive TERMINAL RESPONSE (in the case of eUICC profile state change) from the modem or may be reset (in the case of UICC reset, TERMINAL RESPONSE may not be needed), and may complete changing of the state of the corresponding profile.

If the MEP supporting eUICC needs to transmit a REFRESH command to the modem in order to implement eUICC memory reset since an enabled profile is present in the eUICC as illustrated in case 2 of FIG. 4B, the eUICC may delete all, irrespective of whether the state of the installed profile is enabled or disabled, and may transmit a REFRESH proactive command to the modem by selecting one of operations 4-30, 4-35, 4-60, 4-70, and 4-73 as described above. If an enabled profile is not present and only deleting operation is performed, the eUICC may not need to transmit the REFRESH proactive command. In the above description, the operation in which the eUICC transmits a REFRESH proactive command including a port number via a specific port may include an operation in which the eUICC transmits a request for refreshing, including a port number, via one port, and an operation in which the eUICC prepares and transmits the REFRESH proactive command via a port corresponding to the transmitted port number.

Figure 5:
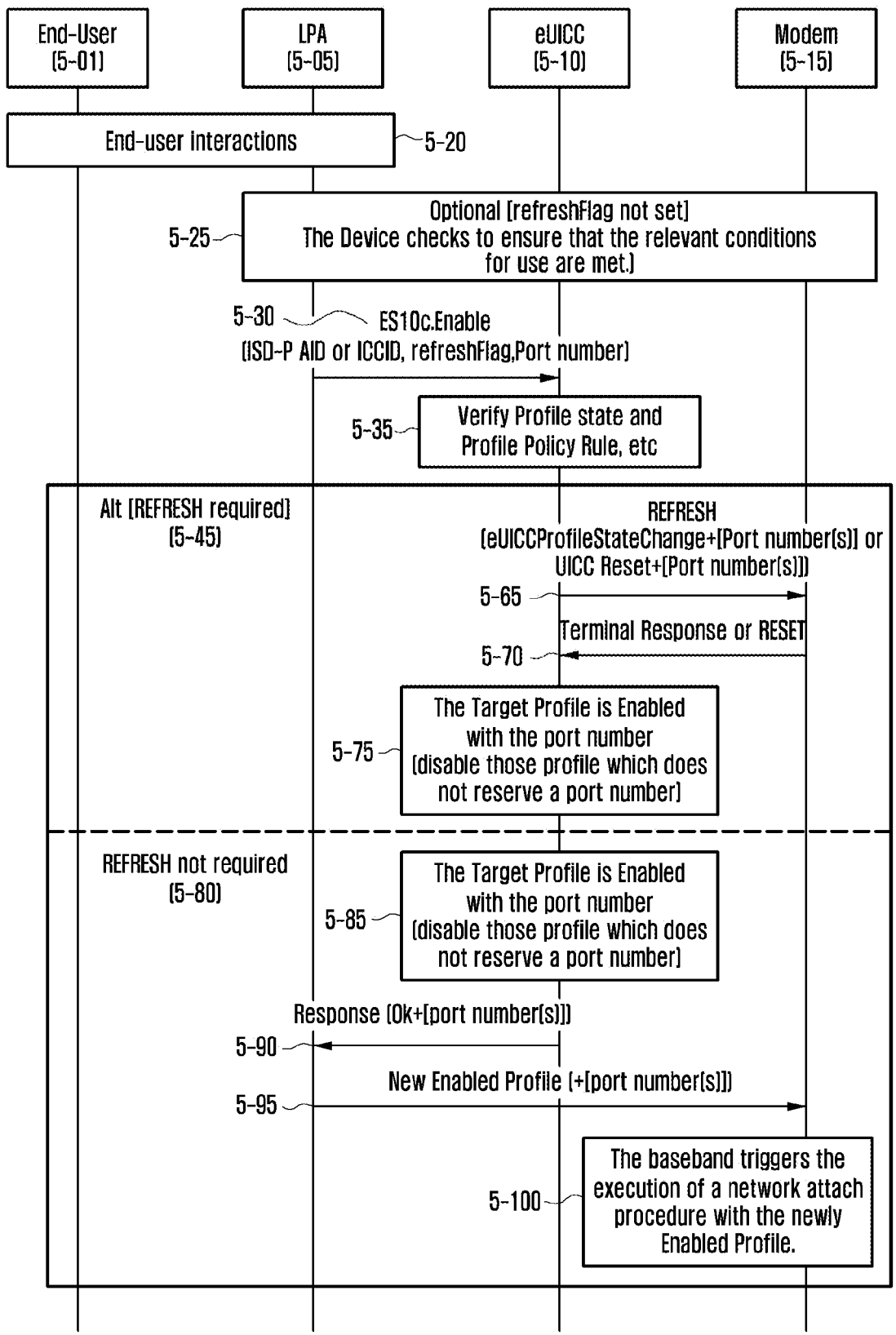
FIG. 5 is a flowchart illustrating a method of processing local profile enabling in a terminal according to the disclosure.

FIG. 5 is a flowchart illustrating a method of processing local profile enabling in a terminal according to the disclosure.

As described above, a v2 eUICC not supporting an MEP function is designed to enable only one profile. If a profile enabled in advance is present, the v2 eUICC needs to change the state of the enabled profile to a disabled state in order to enable another profile. However, when an eUICC that supports an MEP function implements a profile enable command, there may be the case in which the eUICC is not supposed to disable a currently enabled profile, depending on the location of an eSIM port on which a profile is to be enabled. For example, in the case in which eSIM includes eSIM port 1 and eSIM port 2 and profile 2 is currently enabled on the eSIM port 2, if the eUICC additionally enables profile 1 on eSIM port 1, the eUICC may perform processing not to disable profile 2 which is currently enabled on the eSIM port 2.

In addition, if the terminal has basebands that support different radio access technologies (RATs), a RAT which is capable of being provided via a corresponding profile may be different depending on a baseband since an eSIM port is matched thereto. Accordingly, information need to be provided, which may be used when a user or a server (in the case of RPM) determines an eSIM port to which a profile to be enabled is to be matched. For example, in the case in which eSIM port 1 is matched to a baseband that supports a 4G network and eSIM port 2 is matched to a baseband that supports a 5G network, if a user or a server that performs remote management is aware of the above-mentioned information, it may be helpful when the user or server selects an appropriate eSIM port for enabling a specific profile.

The number of profiles enabled simultaneously in the eUICC at a specific point in time may be limited to be less than or equal to the number of eSIM ports allocated by the eUICC. If it is desired to enable a profile by a user or an SM-DP+, the eUICC may send the maximum number of profiles capable of being enabled in the eUICC to the LPA or SM-DP+ server, in consideration of the number of currently enabled profiles and the number of eSIM ports.

The LPA or terminal software may use the information transferred from the eUICC (e.g., the number of eSIM ports allocated by the eUICC) as information used when the LPA notifies that the currently enabled profile needs to be disabled.

In addition, if the LPA transmits an enable message including a port number to the eUICC, the eUICC that receives the same may process the message and may transmit a message which is associated with refreshing and includes the port number, for example, a REFRESH proactive command to the modem in operation 5-65 or may transmit a response message with the port number to the LPA in operation 5-90. The modem may receive one of the messages from the eUICC or the LPA, may perform refresh for the corresponding port, and may reset the corresponding port. FIG. 5 is a flowchart illustrating a procedure of enabling a profile as an example of the method in which a user 5-01 manages a profile in an MEP supporting terminal using an LPA 5-05. Description will be provided with reference to the case in which an eUICC 5-10, a modem 5-15, and the LPA 5-05 of FIG. 5 all support MEP.

In operation 5-20, the end user 5-01 implements an enable command associated with a profile installed in a terminal based on information displayed by the LPA 5-05 or an application in which the LPA 5-05 is implemented and integrated. An example of a screen displayed on a user screen while the corresponding enable command is implemented will be described with reference to FIGS. 6A to 6D. The LPA 5-05 or the corresponding application of the terminal may display a combination of one or more pieces of information among a radio access technology which may be provided for each baseband of the terminal modem and matched eSIM port information for APDU transmission between a baseband and a corresponding profile, obtained from the terminal, and the profile occupancy state of a port(s) obtained from the eUICC, and the like, in addition to the list of profiles installed in the eUICC and the current state information of the corresponding profile. In this instance, the LPA may identify profile policy rules of the profile, and may additionally display a warning message or the like, such as a message indicating profile enabling is unavailable, to the end user 5-01.

If the user 5-01 selects and determines to enable a specific profile, for example, profile 3, via the information displayed on the screen, the LPA 5-05 may transmit an ES10c.EnableProfile(ISD-P AID (issuer security domain— profile application ID) or ICCID (profile ID), refreshFlag, port number) command, include a port number matched to a selected baseband, to the eUICC in operation 5-30. If a port number is not determined at the corresponding point in time, the LPA 5-05 may transmit the message of operation 5-30 without a port number, or may the message of operation 5-30 with identification information which indicates that the eUICC needs to determine a port number and to perform processing. If the eUICC determines a port number, the eUICC may include the port number in a response message and may send, as a response, the message to the LPA in operation 5-90. The message that the LPA transmits to the eUICC may be transmitted by being contained in data of Command APDU that the modem transmits to the eUICC. The message that the eUICC transmits to the LPA may be transmitted by being contained in data of a response APDU. As an identifier indicating that the eUICC needs to determine a port number, a specific port number, for example, −1, may be used. If refreshing is requested via a response message that the card sends to the terminal as a response, for example, if transmission of a REFRESH proactive command is required, refreshFlag may be additionally set and transmitted. In the case in which refreshFlag is not set, if a previously enabled profile is present, the terminal may need to satisfy a condition for enabling a profile in the MEP mode, such as terminating an application session associated with a port occupied between the UICC and modem, closing a logical interface or channel, and the like, via implementation by the terminal.

If the eUICC 5-10 receives the corresponding profile enable command from the LPA 5-05 in operation 5-30, the eUICC may perform a procedure of disabling a profile (profile 1) that occupies the corresponding port, and may perform an enabling process on the corresponding port. In operation 5-35, the ISD-R of the eUICC 5-10 may identify the corresponding profile 3 to be enabled, the enabled state of profiles installed in advance in the eUICC, and profile policy rules (PPR), and may comprehensively determine whether enabling of the corresponding profile 3 is available. If enabling is unavailable, the ISD-R may send, as a response, an error message to the user. When the eUICC 5-10 that supports MEP determines whether enabling the corresponding profile 3 is available in operation 5-35, if a port on which profile 3 is desired to be enabled is already occupied by that another profile, for example, profile 1, the eUICC may determine to change the state of profile 1 which has used the corresponding port to a disabled state and to change the state of profile 3 to an enabled state, so as to process enabling on the corresponding port. If profile 3 uses an empty port, the eUICC 5-10 that supports MEP may proceed with enabling without performing a procedure of disabling another profile in the eUICC. In the embodiment in which refreshFlag is set and profile state changing is performed, the eUICC may transmit a command that requests refreshing to the modem and may request processing of operations associated with profile state changing.

Figure 8A:
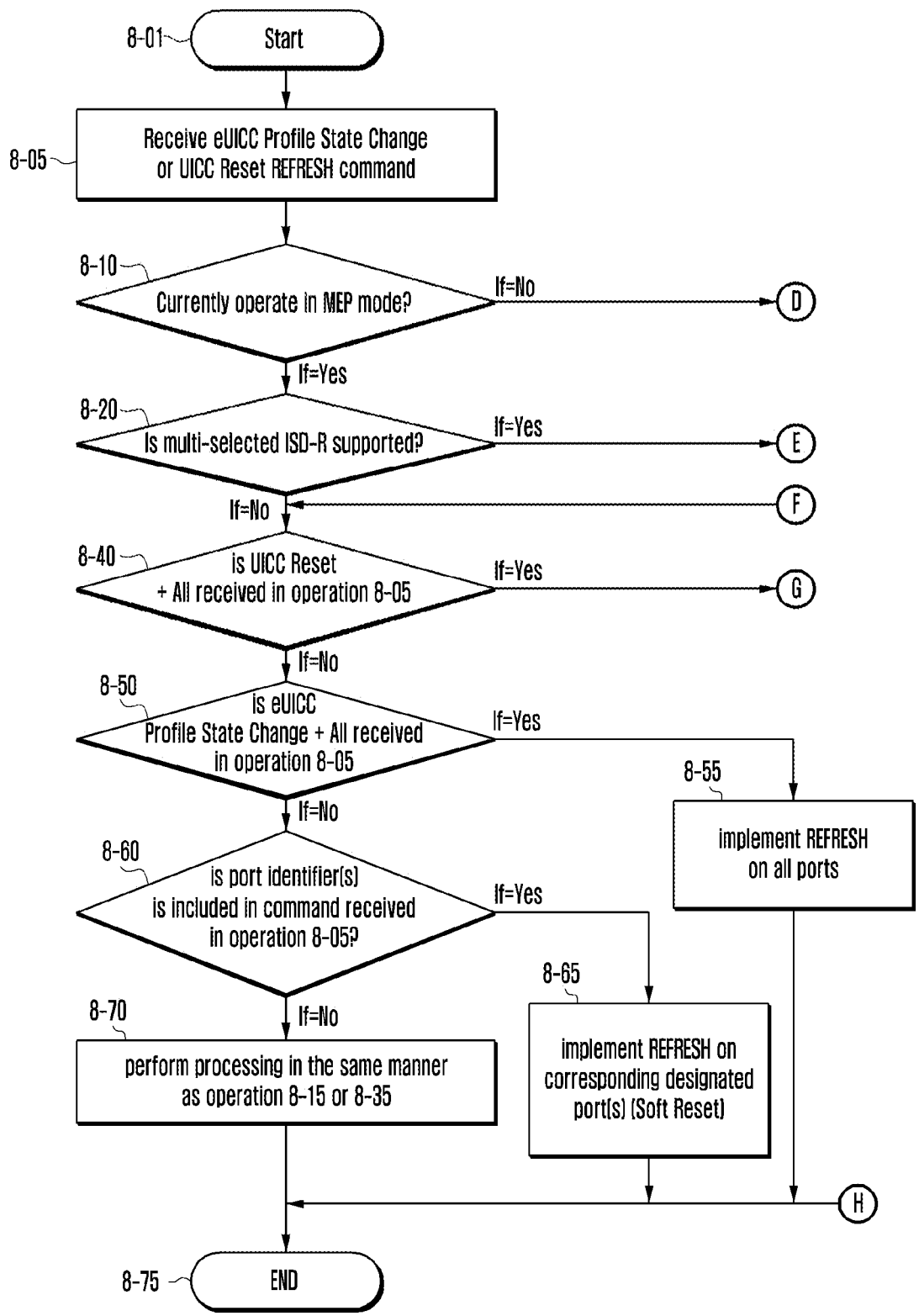
FIG. 8A is a flowchart illustrating a process of determining processing of a received REFRESH command in a modem that receives the REFRESH command.
Figure 8B:
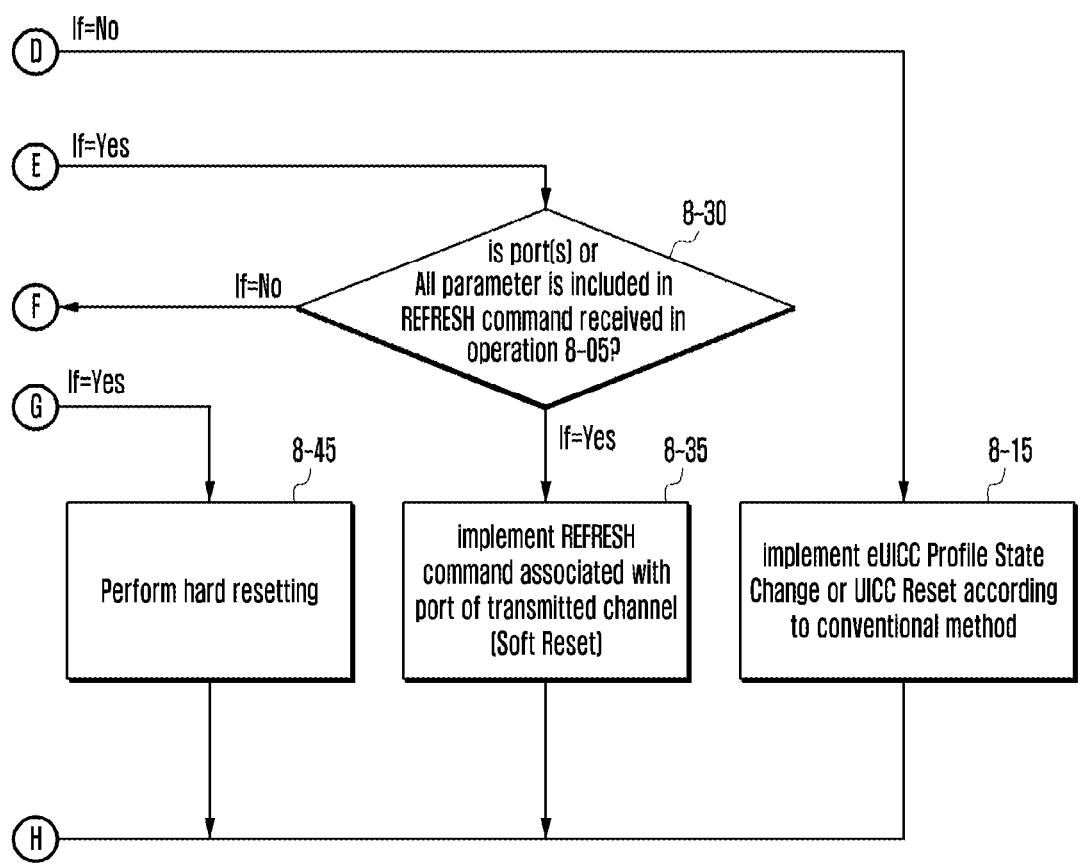
FIG. 8B is a flowchart illustrating a process of determining processing of a received REFRESH command in a modem that receives the REFRESH command.

For example, in the case in which a REFRESH proactive command is used, the corresponding eUICC may transmit a REFRESH proactive command to the modem as described in FIGS. 4A and 4B so that the modem may perform processing as described in FIGS. 8A and 8B. According to a result obtained after the modem processes the corresponding REFRESH, the eUICC may receive Terminal Response (if eUICC profile state change is transmitted) or RESET (if UICC reset is processed) in operation 5-70, and may match the selected profile 3 to the port number transmitted in operation 1-30. If a profile previously enabled on the corresponding port is present (profile 1), the eUICC may disable the profile and performs an enabling process. If an enabling process is performed on a port that is not occupied, the eUICC may enable only the corresponding profile 3 and may complete the process in operation 5-75.

If refreshFlag is not set in operation 5-30, the eUICC may match, after operation 5-35, the selected profile 3 to the port number transmitted in operation 1-30. If a profile previously enabled on the corresponding port is present (profile 1), the eUICC may disable the profile, and may perform an enabling process. If the eUICC performs an enabling process on a port that is not occupied, the eUICC may enable only the corresponding profile 3 in operation 5-85.

The eUICC 5-10 may send, as a response, a result of the corresponding procedure to the LPA 5-05 in operation 5-90. The corresponding message sent as a response may include a port number(s) that requires port resetting. In addition, although the message is received without the corresponding port number(s), the LPA 5-05 may determine a port number that requires port resetting, may include the port number in the message, and may transmit the same to the modem.

The LPA 5-05 may include the port number(s), which is received from the eUICC or which is determined and added by the LPA, in the message, and may transmit the message to the modem 5-15 so that the modem is capable of performing refreshing, such as eUICC profile state changing or UICC resetting, for example, deleting a cached value associated with the corresponding connected port in accordance with profile state changing. In addition, the modem may proceed with a UICC activation procedure including TERMINAL PROFILE procedure defined in ETSI TS 102 221 clause 14.5.1 in operation 5-95. Subsequently, in a baseband connected to the corresponding port, the LPA 5-05 may perform a network attach procedure based on information associated with the profile newly connected to the port in operation 5-100. If refreshFlag is not set, the method of transmitting a REFRESH command to the modem will be described in detail in FIG. 11.

Although not illustrated in the drawing, if the ISD-R receives port information associated with a port mapped to a profile from the LPA, the ISD-R may update metadata of the corresponding profile with the information, and may provide the information when the LPA requests information for local profile management from the ISD-R, or when the LPA requests information for remote profile management by the SM-DP+. The ISD-R may provide state information of an installed profile, mapping information between a corresponding profile and a port, and information associated with a profile enabled in the eUICC. In addition, the ISD-R of the eUICC may provide, to the LPA, information associated with whether a profile is capable of being executed sorely or together with another profile when the profile is installed or enabled, by additionally specifying, in the metadata of the profile, profile policy rule (PPR) indicating whether the profile is available in the MEP environment. Accordingly, the user or the SM-DP+ server may use the corresponding information.

According to an embodiment, the LPA may obtain a port number and may transmit a profile management command message including the obtained port number to the eUICC. The eUICC may identify information associated with refreshFlag and the port number in the received message, and may connect a profile using the designated port number. In this instance, if a port number is not received or the eUICC has separate identification information associated with setting a port, the eUICC may additionally determine connection of the profile on a specific port, and may perform processing. In addition, the eUICC may transmit a message including a port number directly to the modem or to the LPA in accordance with profile state changing so that the modem performs refreshing a port corresponding to the received port number.

FIGS. 6A, 6B, 6C, and 6D are diagrams illustrating implementation examples of a profile management screen of an MEP supporting terminal provided to a terminal user according to the disclosure.

As described above, via an LPA or an application screen in which an LPA is implemented, a user may receive information associated with a profile installed in an eUICC and profile state information such as an enabled state/disabled state. In addition, an MEP terminal provides the capability of radio access technology for each baseband in a modem, information associated with which baseband is connected to which eSIM port, and information associated with an enabled profile that uses a corresponding port is present (whether a port is occupied). Accordingly, the user may determine a port to be used for enabling a profile in the eUICC via the corresponding screen. The corresponding information may be information shown to the user via the LPA or the screen of an application in which the LPA is implemented, for local profile management. For remote profile management (RPM) via an SM-DP+ server, the corresponding information may be transmitted together with port capability of deviceinfo of FIG. 7, and based on a combination of the corresponding information, the SM-DP+ may determine a port on which a profile is to be enabled/disabled and may send the same to the terminal as a response. FIGS. 6A, 6B, 6C, and 6D are diagrams illustrating examples of representative providable combinations case 1 6-01 of FIG. 6A, case 2 6-05 of FIG. 6B, case 3 6-55 of FIG. 6C, and case 4 6-80 of FIG. 6D among various combinations displayable to a user, and description will be provided under the assumption that eSIM port 1 is connected to a 4G supporting baseband of the modem, and eSIM port 2 is connected to a 5G supporting baseband of the modem.

A terminal may combine at least one piece of information among port information, profile state information, a profile list, and providable RAT information, and may show the whole or a part of the combination to a user.

Figure 6A:
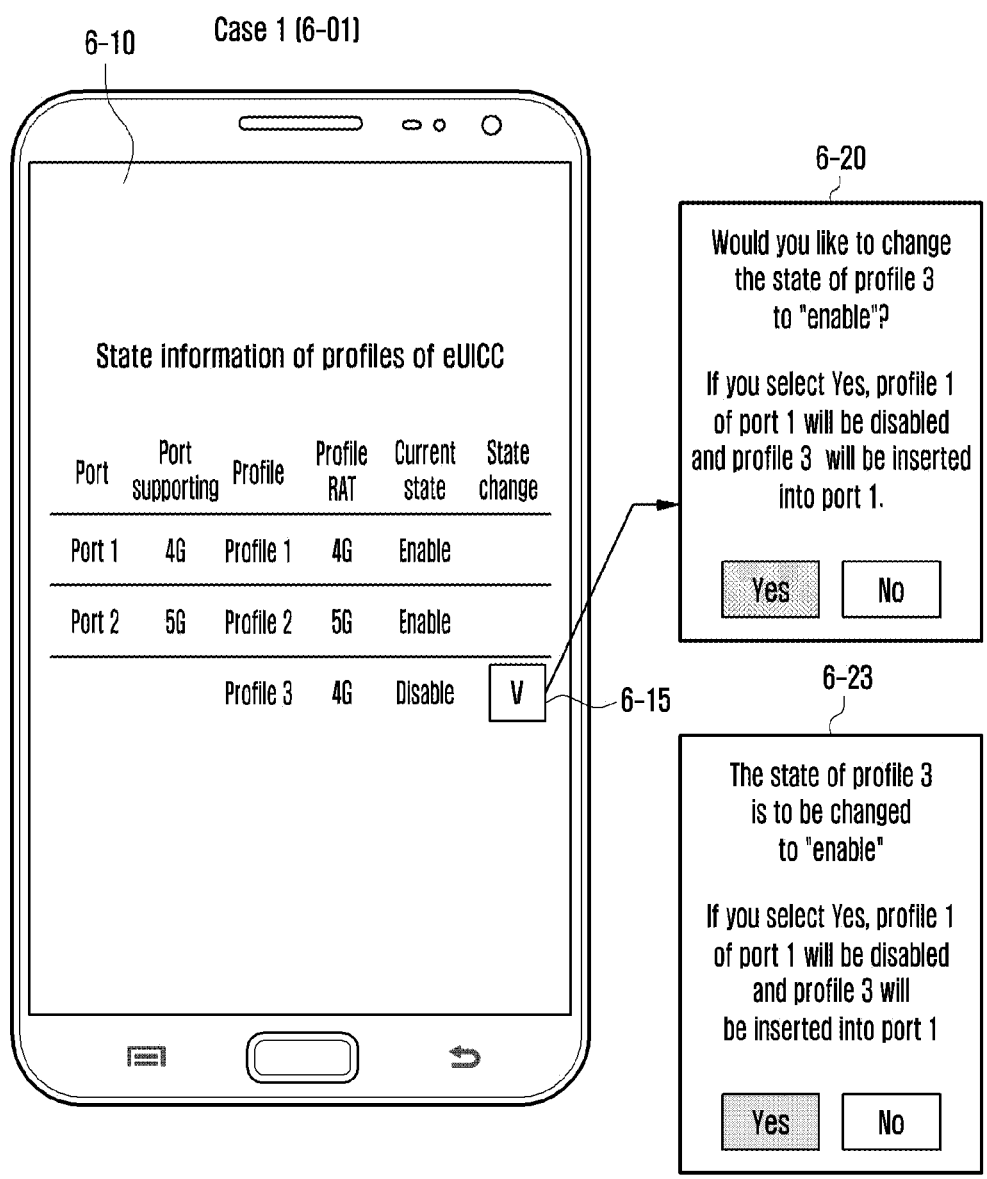
FIG. 6A is a diagram illustrating an implementation example of a profile management screen (case 1) that an MEP supporting terminal provides to a user of the terminal according to the disclosure.

In the case in which profile 3 is desired to be enabled in case 1 6-01 of FIG. 6A, if the user specifies state changing of the corresponding profile as shown in diagram 6-15, the terminal needs to change the state of profile 1 to a disabled state since the profile 3 supports only 4G in the example. Accordingly, the terminal may need to explicitly inform the user of the same as shown in diagram 6-20, may obtain user consent, and may proceed with a subsequent procedure. In the case of RPM which will be described with reference to FIG. 7, information displayed in diagram 6-10 may be transmitted to the SM-DP+ server as eSIM port capability. Based on the combination of RAT information for each connected baseband and port occupancy state of the eSIM port capability, the SM-DP+ may display a screen 6-23 to the user, may obtain user consent, and may complete an RPM-Enable procedure.

Figure 6B:
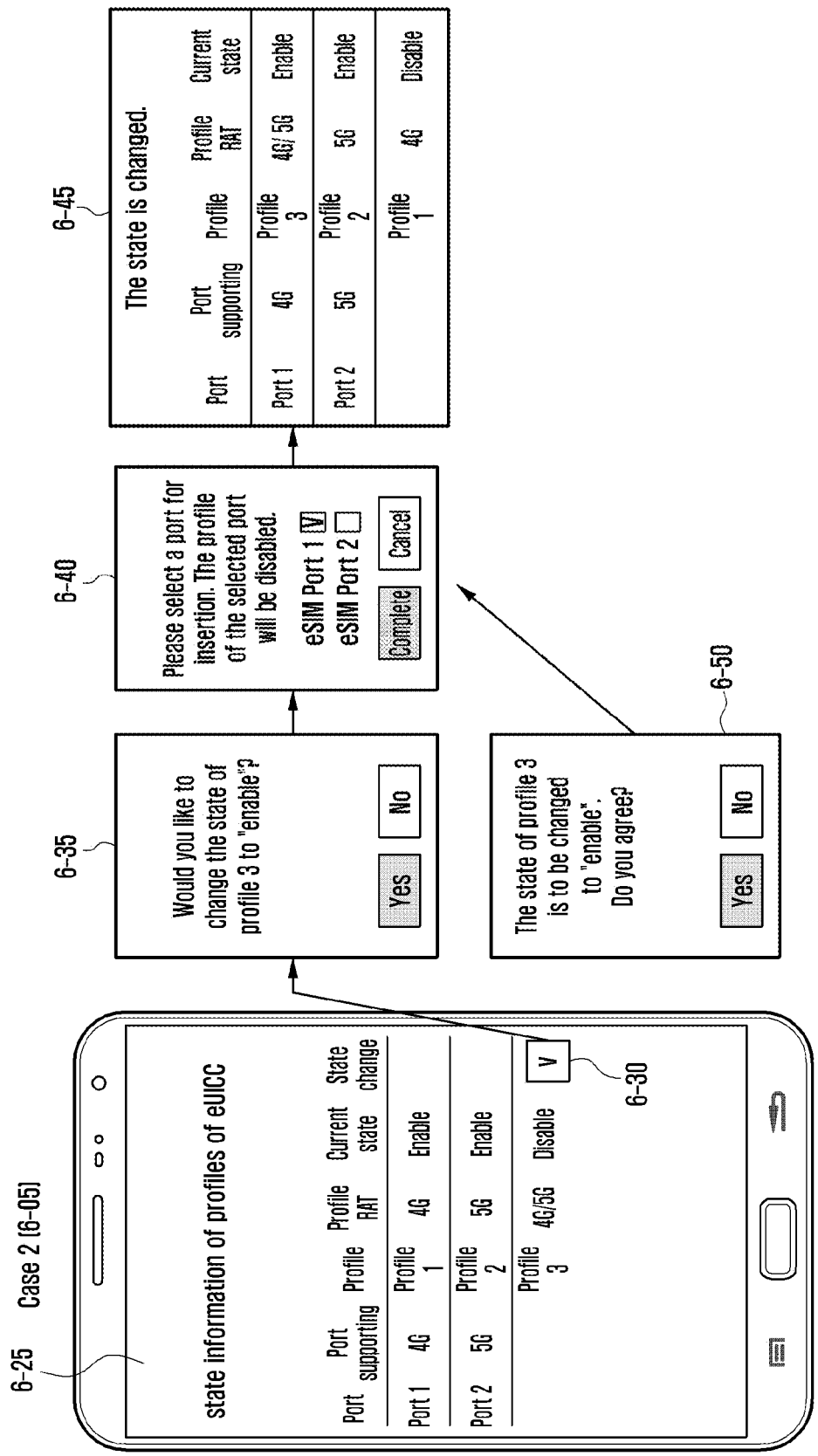
FIG. 6B is a diagram illustrating an implementation example of a profile management screen (case 2) that an MEP supporting terminal provides to a user of the terminal according to the disclosure.

Case 2 6-05 of FIG. 6B is the case in which a profile desired to be enabled supports 4G or 5G radio access technology. In this instance, if a user desires to enable the profile, a terminal may configure a screen for enabling the user to make an additional selection as shown in diagram 6-40 since the user may enable the profile for port 1 or port 2, may receive a final selection from the user, may output a corresponding result, and may display the same to the user. In the case of RPM-Enable, the SM-DP+ server may designate a single port via determination, such as selecting the highest radio access technology, based on the combination of RAT information for each connected baseband and a port occupancy state of the eSIM port capability, and may provide a command associated with enabling on the corresponding port as shown in diagram 6-23. Alternatively, the SM-DP+ server may transmit a message associated with an additional user selection or a URL including the corresponding message to the terminal, the terminal may obtain user consent based on the corresponding information as shown in diagrams 6-50 and 6-40, and the server may receive the same. The server may enable the profile on the finally selected port and may display a corresponding result value to the user as shown in diagram 6-45.

Figure 6C:
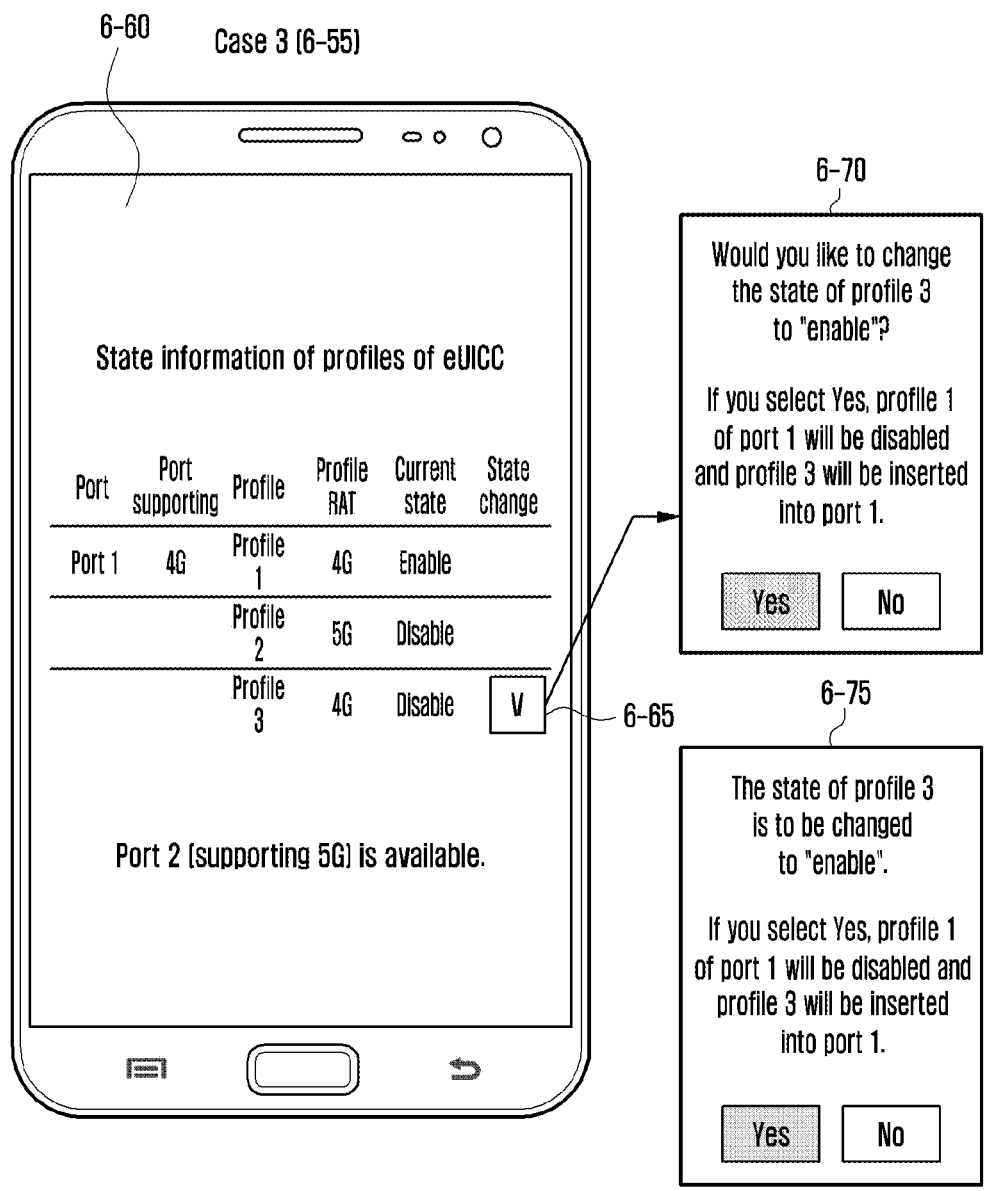
FIG. 6C is a diagram illustrating an implementation example of a profile management screen (case 3) that an MEP supporting terminal provides to a user of the terminal according to the disclosure.

Case 3 6-55 of FIG. 6C is the case in which a radio access technology (e.g., 4G) which is supported by profile 3 desired to be enabled does not match a radio access technology (e.g., 5G) supported by a baseband connected to port 2 which is not occupied. In this instance, profile 1 which occupies a port connected to 4G is disabled and the corresponding port may be used. In this instance, in the case of local profile Enable, a screen as shown in diagram 6-70 may be configured and displayed. Alternatively, in the case of RPM-Enable, a screen as shown in diagram 6-75 may be configured and displayed.

Figure 6D:
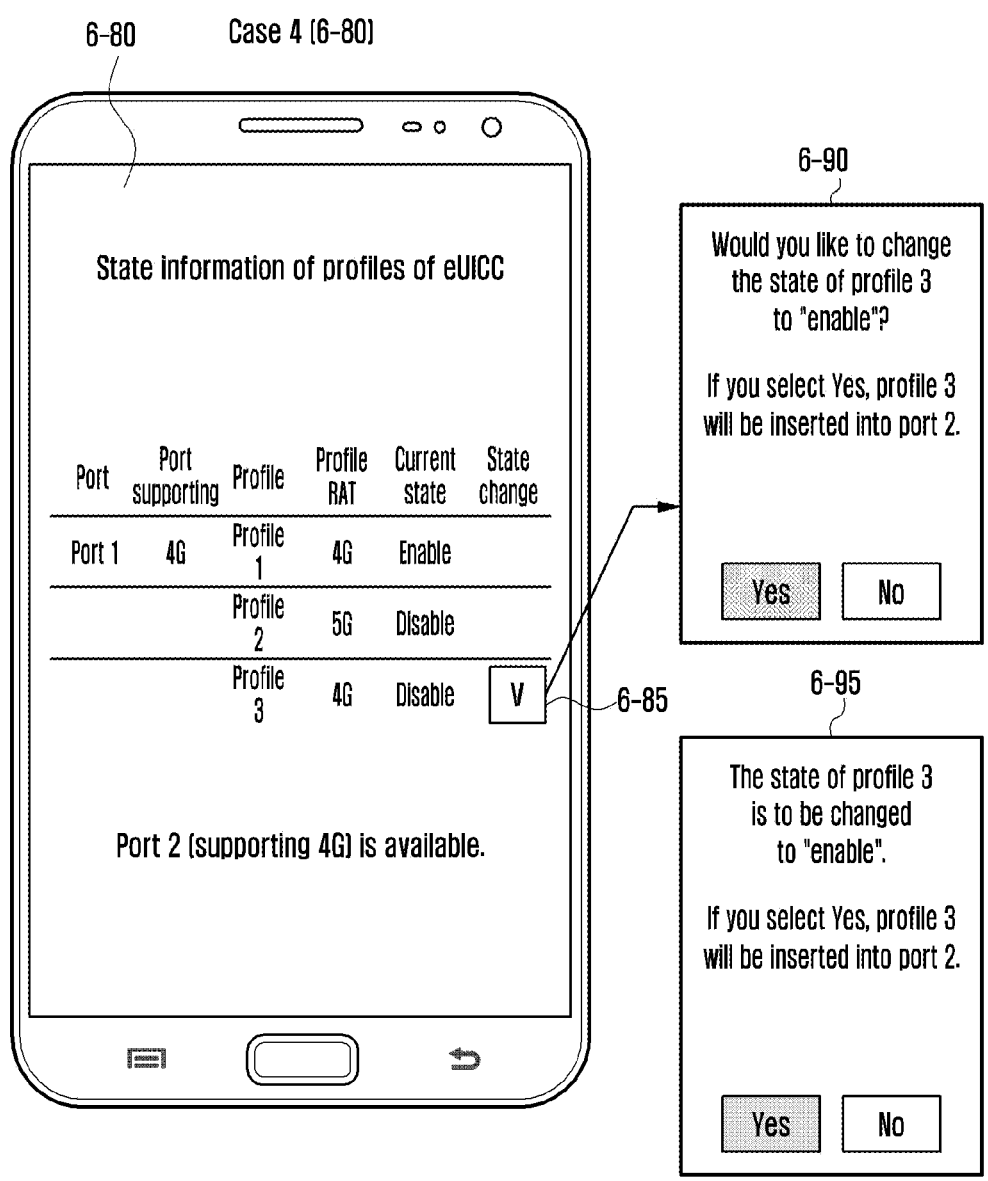
FIG. 6D is a diagram illustrating an implementation example of a profile management screen (case 4) that an MEP supporting terminal provides to a user of the terminal according to the disclosure.

Case 4 6-80 of FIG. 6D is the case in which a port that is not occupied is present in the eUICC, and a radio access technology which is supported by profile 3 desired to be enabled matches a radio access technology which is supported by a baseband connected to port 2 that is not occupied, and thus, the corresponding port 2 may be used without disabling another profile. In this instance, in the case of local profile Enable, a screen as shown in diagram 6-90 may be configured and displayed. Alternatively, in the case of RPM-Enable, a screen as shown in diagram 6-95 may be configured and displayed.

Figure 7:
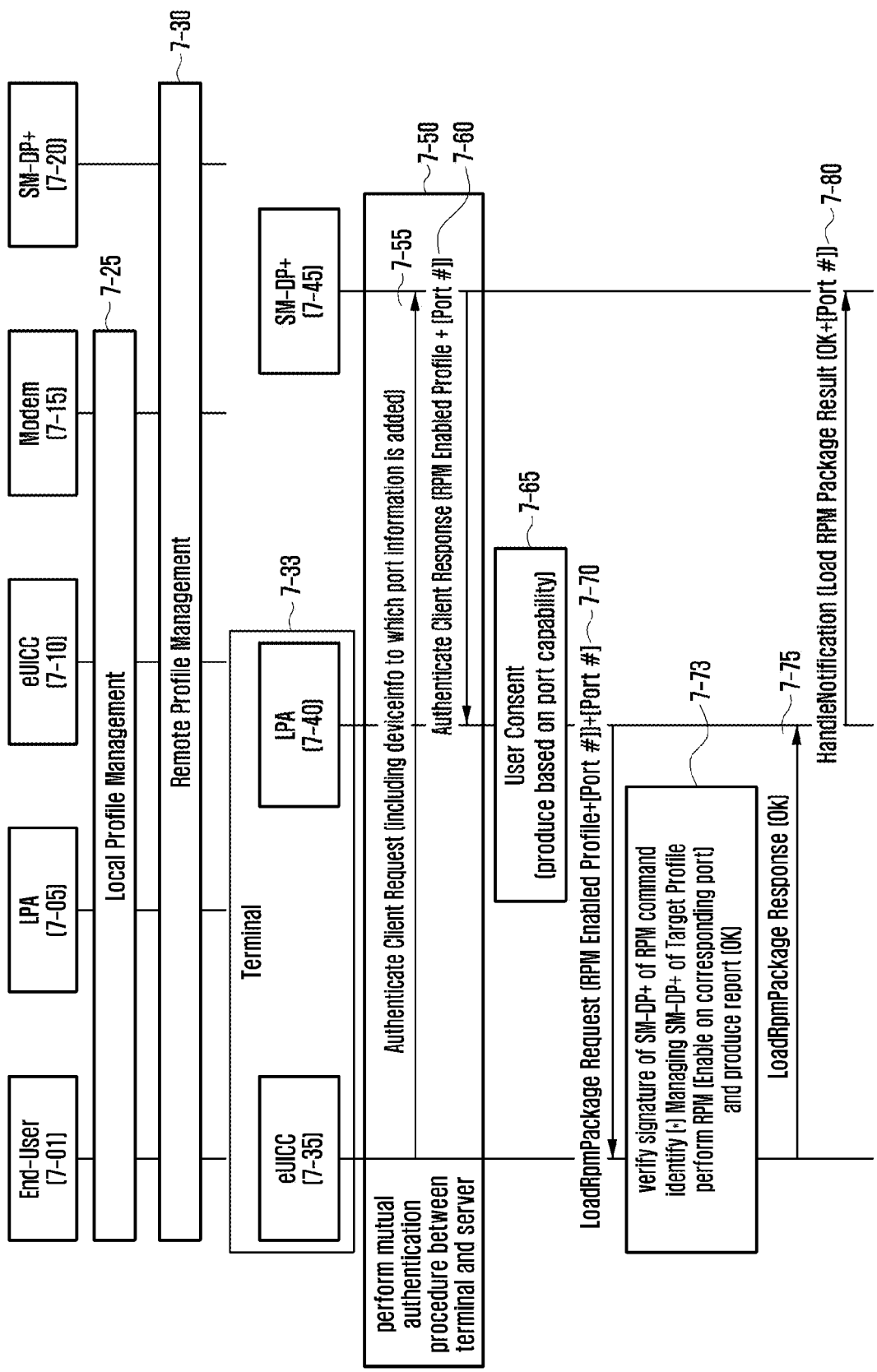
FIG. 7 is a flowchart illustrating a method in which a terminal and a profile server process remote profile enabling (RPM-Enable) according to the disclosure.

FIG. 7 is a flowchart illustrating a method in which a terminal and a profile server process remote profile enabling (RPM-Enable) according to the disclosure.

In order to manage (enable/disable/delete/update) a profile downloaded to a terminal, a method 7-25 may be performed in which a user transmits a corresponding command to an eUICC 7-10 via an LPA 7-05 of the terminal at a local level, and the LPA 7-05, the eUICC 7-10, and a modem 7-15 may process the same and may send a result to the user 7-01 as a response. The detailed description of an enabling procedure (Enable) in the local profile management has been described with reference to FIG. 5, and thus, detailed description thereof will be omitted. A profile management server 7-20 may remotely transmit, to the terminal, a request 7-30 for managing (enabling/disabling/deleting/updating) a profile downloaded in advance in the terminal with reference to specific data transmitted from the terminal, instead of the user 7-01.

Reference numerals 7-35 to 7-80 show an example of a normal procedure in which the terminal receives a remote management command from the profile server and processes the same, according to an embodiment of the disclosure. If a terminal 7-33 supports a multiple enabled profile (MEP) mode, a procedure that needs to be changed when compared to before is illustrated in the corresponding drawing The terminal 7-33 may be a terminal in which an eUICC 7-35 is included and an LPA 7-40 for controlling the eUICC 7-35 is installed. In addition, one or more profiles may be installed in the terminal or the eUICC 7-35. In addition, in each installed profile, one or more profile server may be specified, which is capable of remotely controlling the corresponding profile. Hereinafter, although a manager profile server (managing SM-DP+) or an SM-DP+ are illustrated as an example of a profile server, the profile server of the disclosure is not limited thereto. The list of specified manager profile servers may include the address or unique identifier (object identifier) of each manager profile server which is written in the form of IP address or FQDN. Although not illustrated in the drawing, a remote profile management command that a communication operator has requested may be produced and may be on standby in the profile server 7-45.

The profile server 7-45 may transmit the remote profile management command to the LPA 7-40 in operation 7-60. For example, the profile server 7-45 may use an authenticate client response message including at least one remote management command and the digital signature of the profile server 7-45 in operation 7-60. The digital signature of the profile server 7-45 may be calculated based on the at least one remote management command. Although the diagram illustrates an example in which only a single "enable profile" remote management command is transmitted in operation 7-60, one or more remote management commands may be transmitted. It should be understood that the command may not necessarily be a "enable profile" remote management command, but may be various types of remote management commands such as "disable profile," "delete profile," and the like.

Referring to FIG. 7, a common mutual authentication procedure between the terminal 7-33 and the profile management server 7-45 may be performed in operation 7-50. Operation 7-50 may include a TLS connection based on server authentication. In addition, for example, one or more operations of transmitting and receiving at least an initiate authentication request message, an initiate authentication response message, and an authenticate client request message may be included. In addition, operation 7-50 may be an operation integrated with a part or the whole of operation 7-60.

In the corresponding procedure, ES9+.AuthenticateClient (transactionId, authenticateServerResponse) including predetermined information collected from the LPA 7-40 of the terminal 7-33, the eUICC 7-35, and the inside of the terminal may be transmitted to the SM-DP+ 7-45, as an authentication client request message. The corresponding authenticateServerResponse may include euiccInfo 2 and deviceinfo. Euiccinfo2 denotes information associated with the eUICC 7-35 defined in SGP.22. deviceinfo denotes information associated with the terminal 7-33 defined in SGP.22. The corresponding SM-DP+ 7-45 may use the whole or a part of euiccinfo2 and deviceinfo received as the authentication client request, as specific information for determining whether to perform RPM associated with a profile installed in advance in the MEP terminal. The terminal may transmit, to the SM-DP+ 7-45, a message 7-55 that includes deviceinfo as a part of attributes of ES9+.AuthenticateClient (transactionId, authenticateServerResponse) or as a separate message.

The capability of the eUICC indicating that the eUICC is an MEP supporting eUICC is specified in euiccinfo2 transmitted from the terminal. In the case of deviceinfo in operation 7-55, the eSIM port capability of deviceinfo may include one or more pieces of information among a port number, an international mobile equipment identity (IMEI) number mapped to the corresponding port, and radio access technology information of a baseband used by the corresponding port, as port identity information and specific information associated with a port. Alternatively, the terminal 7-33 may produce deviceinfo mapped to each baseband in the terminal based on the number of basebands, may include one or more deviceinfo, and may transmit the same in operation 7-55. For example, in the case of the terminal that supports a dual SIM, the terminal may produce two pieces of deciceinfo and may transmit the same. For example, the port capability information of deviceinfo transmitted by the terminal may be extended and specified as below. Although the range of a port index is specified as 1.MaxNumOfPort, as shown in Table 3 below, as an example, the port index may be a specific number designated by the terminal.

TABLE 3

-- ASN1START
DeviceInfo ::= SEQUENCE {
   tac Octet4,
   deviceCapabilities DeviceCapabilities,
   imei Octet8 OPTIONAL, TABLE 3-continued

```
    preferredLanguages    SEQUENCE  OF  UTF8String  OPTIONAL,  --
#SupportedFromV3.0.0#
        enterpriseCapableDevice NULL OPTIONAL, -- #SupportedForEnterpriseV3.0.0#
        deviceTestMode NULL OPTIONAL, -- #SupportedFromV3.0.0#if present the
        Device
is operating in Device Test Mode
        lpaRspCapability LpaRspCapability OPTIONAL, -- #SupportedFromV3.0.0#
        eSIM-PortCapabilities    SEQUENCE  (  SIZE  (1..MaxNumOfPort))  OF
PortCapability OPTIONAL    -- #SupportedFromV3.0.0#
}
PortCapability ::= SEQUENCE {
    portIndex        Integer(1..MaxNumOfPort),
    status     ENUMERATED {occupied, empty},
    imei Octet8 OPTIONAL,
    gsmSupportedRelease VersionType OPTIONAL,
    utranSupportedRelease VersionType OPTIONAL,
    cdma2000onexSupportedRelease VersionType OPTIONAL,
    cdma2000hrpdSupportedRelease VersionType OPTIONAL,
    cdma2000ehrpdSupportedRelease VersionType OPTIONAL,
    eutranEpcSupportedRelease VersionType OPTIONAL,
    nrEpcSupportedRelease VersionType OPTIONAL, -- #SupportedFromV3.0.0#
    nr5gcSupportedRelease VersionType OPTIONAL, -- #SupportedFromV3.0.0#
    eutran5gcSupportedRelease VersionType OPTIONAL -- #SupportedFromV3.0.0#
}
```

The supported radio access technologies (RAT) information of the port capability may be identical to ratio access technologies (RAT) of device capabilities or may be a subset thereof. If two pieces of deviceinfo are produced and transmitted, it is specified that two pieces of deviceinfo are to be transmitted as shown in Table 4 below.

TABLE 4

```
CtxParamsForCommonAuthentication ::= SEQUENCE {
    matchingId [0] UTF8String OPTIONAL, -- The MatchingId could be the Activation
code token or EventID or empty
    deviceInfo [1] DeviceInfo, -- The Device information
        additionalDeviceInfo [X] SEQUECNE OF DeviceInfo OPTIONAL, -- The Device
information #SupportedFromV3.0.0#
        operationType    [2]    OperationType  DEFAULT  {profileDownload},    --
#SupportedFromV3.0.0#
        iccid Iccid OPTIONAL, -- ICCID, tag '5A'#SupportedFromV3.0.0#
        matchingIdSource [3] MatchingIdSource OPTIONAL, -- #SupportedFromV3.0.0#
        vendorSpecificExtension    [4]    VendorSpecificExtension    OPTIONAL    --
#SupportedFromV3.0.0#
}
```

In consideration of compatibility with the SM-DP+ 7-45 that is capable of performing RPM but does not support MEP, the dual SIM terminal may select mainly used eSIM port information according to selection by the terminal or a user, may transmit the same as deviceinfo, and may separately transmit other eSIM port information as additional deviceinfo. In addition, only in the case of RPM operation, the terminal may include eSIM port information in the message of operation 7-55 and may transmit the same to the SM-DP+ 7-45. In this instance, only when the terminal desires to transmit CtxParamForCommonAuthentication, which is included in authentication client request for transmission, by setting operationType=rpm, the terminal collects eSIM port information, includes the collected eSIM port information in deviceinfo, and transmits the same to the SM-DP+ 7-45.

If the SM-DP+ 7-45 that receives the corresponding port information is an SM-DP+ 7-45 that supports both MEP and RPM, the SM-DP+ 7-45 may identify the number of ports and may determine whether each port is occupied by another profile, based on the port capability provided from the terminal, and may determine a port on which an enabled command is to be requested, and may transmit an RPM command to the terminal. If all profiles of all ports are occupied, the SM-DP+ 7-45 may transmit a message indicating that all ports are occupied and enabling is unavailable to the terminal 7-35, and may additionally transmit port information associated with a port that needs to be empty for enabling to the terminal 7-35 so that the user is capable of performing a disabling procedure on a profile connected to the corresponding port at a local level in operation 7-65.

In operation 7-65, if the user receives the corresponding message and performs local profile disabling, the terminal 7-40 may transmit a corresponding result to the server 7-45, so as to request reattempt for receiving an RPM message or to restart an initial RPM request, and may proceed with a subsequent procedure. As described above, the terminal 7-33 may match a baseband and a port, may configure deviceinfo based on each baseband information, and may transmit one or more pieces of deviceinfo to the SM-DP+. If the SM-DP+ 7-45 that receives the corresponding deviceinfo(s) does not support MEP and supports RPM, the SM-DP+ 7-45 may select one of the deviceinfo(s) and may request the terminal LPA 7-40 to implement RPM-Enable based on the corresponding deviceinfo.

The LPA 7-40 that receives the RPM request may transfer a remote profile management command to the eUICC 7-35 in operation 7-70. In operation 7-70, the LPA 7-40 may use, for example, a remote management input request (load RPM package request) message including at least one remote management command and the digital signature of the profile server 7-45, and the LPA may explicitly specify and transmit information associated with an eSIM port to be connected when the corresponding profile is enabled, in order to support MEP. The remote management input request message transferred from the LPA to the eUICC may include the whole or a part of the authentication client response message in operation 7-60.

The remote management input request message (load RPM package request) transmitted from the LPA 7-40 to the eUICC 7-35 may be a message such as ES10b.LoadRpmPackage (smdpSigned3, smdpSignature3, [e SIM port number]) or ES10b.LoadRpmPackage (smdpSigned3, smdpSignature3)+[e SIM port number].

A remote management command such as profile enabled/disabled/delete command or the like may be included in RpmPackage of smdpsigned3 signed by the SM-DP+. The eSIM port information selected by the SM-DP+ 7-45 may be included in the smdpSigned3 signed by the SM-DP and may be sent as a response (e.g., included as a part of a command of RpmPackage which is a parameter in smdpSigned3, or included as an additional parameter outside RpmPackage of smdpSigned3), or may be added outside smdpSigned3 and may be sent as a response.

If eSIM port information is outside smdpSigned3, the LPA may correct the information autonomously or according to a selection by a user. The SM-DP+ 7-45 may add the port number of a port to be used, outside smdpSigned3 and may send as a response, so as to implicitly indicate that the corresponding port number is changeable by a user or a terminal setting. In the case in which SM-DP+ 7-45 adds, outside smdpSigned3, the port number of a port to be used and transmits the same to the LPA 7-40 as the authentication client response message in operation 7-60, the LPA 7-40, after RPM processing, may include the port number in HandleNotification (Load RPM Package Result (OK+[Port #]) and may send the same as a response in operation 7-80, so as to inform the SM-DP+ 7-45 of the finally designated port number.

In operation 7-60, the SM-DP+ 7-45 may send, as a response, an authentication response message without eSIM port information to the LPA 7-40. For example, if deviceinfo that the terminal transmits to the SM-DP+ 7-45 in operation 7-55 does not include identification information associated with supporting of MEP, or if the SM-DP+ 7-45 receives information associated with supporting of MEP, but does not support MEP, the authentication client response message that the SM-DP+ 7-45 transmits to the LPA 7-40 in operation 7-60 may be transmitted to the eUICC without eSIM port information.

In this instance, the LPA 7-40 adds eSIM port information associated with an eSIM port on which a profile is to be enabled and transmits the message to the eUICC 7-35, or if the LPA 7-40 does not add eSIM port information, the eUICC 7-35 may determine an eSIM port.

In the case in which the LPA adds the eSIM port information, an eSIM port number is added as an additional optional parameter in addition to smdpSigned3 and smdpSignature3, and may be transmitted as a LoadRpmPackageRequest message that the LPA 7-40 transmits to the eUICC 7-35. Alternatively, an eSIM port number may be added as an optional parameter outside the LoadRpmPackageRequest message and may be transmitted.

This may be a message, such as above-described ES10b.LoadRpmPackage (smdpSigned3, smdpSignature3, [eSIM port number]) or ES10b.LoadRpmPackage (smdpSigned3, smdpSignature3)+[eSIM port number]. If the eSIM port is explicitly specified outside smdpsigned3, signature verification is performed, excluding the eSIM port, in operation 7-73 in which the eUICC performs signature verification on the SM-DP+. Therefore, although the eSIM port information is changed by the LPA, this may not be processed as an error in the eUICC.

In the case in which the LPA 7-40 adds eSIM port information, the LPA may autonomously determine an eSIM port on which the corresponding profile is to be enabled, and may transmit the same to the eUICC 7-35. For example, the LPA may identify, based on device capability of deviceinfo2 obtained from the terminal, radio access technology (RAT) information supported for each baseband and empty eSIM ports that are not occupied by profiles, may select one of the empty eSIM ports, may add the port number of the selected empty eSIM port to smdpSigned3 and smdpSignature3 of LoadRpmPackageRequest, and may transmit the same to the eUICC 7-35. Particularly, if the RAT supported for each baseband is identical, the LPA may randomly select one of the empty eSIM ports on which profiles are not enabled.

Alternatively, the LPA 7-40 may obtain a user input associated with an eSIM port on which the corresponding profile is to be enabled, and may transmit the same to the eUICC 7-35. For example, the LPA 7-40 may provide a UI that requests a user to select an eSIM port (or a desired RAT) to be used, may add the eSIM port number of the selected eSIM port to smdpSigned3 and smdpSignature3 of LoadRpmPackageRequest according to the selection of the user, and may transmit the same to the eUICC 7-35.

The terminal 7-33 may designate a default port based on information associated with a port mapped to the baseband of the corresponding deviceinfo or according to a terminal setting, and the LPA 7-40 may add the corresponding information and may transmit ES10b.LoadRpmPackage request (RPM Enable Profile)+eSIM port #or ES10b.LoadRpmPackage request (RPM Enable Profile+eSIM port #) (7-75) to the eUICC 7-35 in operation 7-75, when transmitting ES10b.LoadRpmPackage request for an enabling processing to the eUICC.

The eSIM port information may be changed by the LPA 7-40. For example, although a message including port information is transmitted from the SM-DP+ 7-45 to the LPA 7-40, disabling of a profile enabled on the corresponding port may unavailable. In this instance, if the LPA receives an error message indicating that enabling on the corresponding port is unavailable from the eUICC 7-35 as a response, the LPA 7-40 may add another eSIM port as an optional parameter autonomously or according to a user input, and may transmit again the information so as to set a port. For example, all the RATs supported by basebands of the terminal are identical, the LPA may autonomously change the eSIM port by adding another eSIM port as an optional parameter.

Although eSIM port information is present in smdpSigned3 included in ES10b.LoadRpmPackag, there may be cases in which the LPA 7-40 does not recognize the same, may add an eSIM port number, and may transmit the same to the eUICC 7-35. In this instance, the eUICC 7-35 may attempt to enable a profile preferentially using the eSIM port added by the LPA 7-40, and may send, as a response, port information associated with a port on which the profile is finally enabled as andleNotification (Load RPM Package Result (OK+[Port #]) in operation 7-80.

If an enabling request without port information is transmitted from the LPA to the eUICC 7-35, the MEP supporting eUICC 7-35 designates a default port when performing port initiation among platform-modem-eUICC, and performs connection to the corresponding port if an enabling request is received from the LPA. As another example, if an empty eSIM port is present at the point in time at which the eUICC receives an enabling request, the eUICC may perform enabling on the corresponding port.

As described above, if the LPA receives a profile enable command without port information, the LPA may add a specific port number and may request an enabling processing from the eUICC, or even if the LPA receives a profile enable command with port information, the LPA may change a port number by reason that enabling on the corresponding port is unavailable and may transmit the same to the eUICC, or if the LPA receives a profile enable command without a port number, the MPE supporting eUICC 7-35 may designate a specific port and may perform connection. The methods may be commonly applicable to local profile enabling described with reference to FIG. 5.

In operation 7-73, the eUICC 7-35 may verify the digital signature of the profile server 7-45 received in operation 7-70. The digital signature verification may be calculated based on one or more remote management commands received in operation 7-60. If the digital signature verification is successfully performed, the eUICC 7-35 may identify whether the profile server 7-45 that transmits a remote management command is specified as the management profile server of the target profile of each remote management command, with respect to the one or more remote management commands received in operation 7-60. For example, the remote management commands may take different profiles installed in the eUICC as target profiles, and the target profile of a corresponding remote management command may be identified based on a profile ID (or ICCID) in the corresponding remote management command.

The eUICC 7-35 may implement one or more remote management commands received in operation 7-60 with respect to the target profile of a remote management command, wherein the profile server 7-45 that transmits the remote management command is specified as the management profile server of the target profile. If the eUICC 7-35 receives one or more remote management commands, the eUICC 7-35 may repeatedly perform each remote management command. After implementing each remote management command, the eUICC 7-35 may produce a remote management input result (load RPM package result).

If the eSIM port information is included in smdpsigned3, the LPA is supposed to be incapable of changing the corresponding value included in smdpsigned3 in the middle. However, if the LPA changes the value, the signature verification on the SM-DP+ may fail in operation 7-73 and thus, the eUICC may send an error as a response. In other words, in the case in which the SM-DP+ designates eSIM Port #1 in smdpSigned3 and sends the same to the LPA as a response, if the LPA changes eSIM Port #1 to eSIM Port #2 in the middle, the eUICC that finally receives eSIM Port #2 may send an error as response. That is, eSIM Port included in smdpSigned3 may be designated by SM-DP+, and the LPA is not supposed to add an eSIM port or to change the eSIM port.

In the case in which the LPA adds an eSIM port number and transmits the message to the eUICC, the LPA needs to perform processing so that a new eSIM port parameter is added in the state in which integrity protection of smdpSignature3 is maintained as it is. If the LPA specifies an eSIM port outside smdpsigned3 without modifying a signature value and rpmpackge received from the SM-DP, and transmits the same to the eUICC, the eSIM port may be excluded when the eUICC performs signature verification on the SM-DP+.

The remote management input result in association with the one or more remote management commands that the eUICC 7-35 receives, may include "OK" in the form of a character string including at least one character or a number string including at least one number corresponding thereto if each remote management is successfully performed, or a port number may be additionally included and transmitted. If each remote management fails, the result may include an error code indicating the cause of the failure, and the error code is provided in the form of a character string including at least one character or a number string including at least one number corresponding thereto. The present drawing illustrates that the remote management command received in operation 7-60 is "profile enable" and the eUICC 7-35 successfully enables a target profile and produces a result "OK" in operation 7-73. In operation 7-75, the eUICC 7-35 sends the remote management input result to the LPA 7-40 as a response. The eUICC 7-35 may use a remote management input response (load RPM package response) message including, for example, at least the remote management input result, in operation 7-75.

In operation 7-80, the LPA 7-40 may transmit the remote management input result (load RPM package result) to the profile server 7-45. The LPA 7-40 may use, for example, a notification handling message (handle notification) in operation 7-80. The notification handling message may include the whole or a part of the remote management input response message of operation 7-75. The remote management input response message may include information associated with an eSIM port on which the profile is enabled and may be sent as a response in operation 7-75.

FIGS. 8A and 8B illustrate a flowchart for a process of determining processing of a received REFRESH command in a modem that receives the REFRESH command.

A UICC Reset REFRESH command may be used when a card application toolkit (CAT) of the UICC needs to receive an answer to reset (ATR), or UICC initialization needs to be performed. At the point in time at which the disclosure is provided, if a modem receives the corresponding request, the modem may perform a procedure of terminating all application sessions with the UICC card, may delete a cached value of the UICC, and may request the UICC to perform resetting so that the UICC performs resetting and sends an ATR as a response. Through the above, the modem and the eUICC may start a new card session, and the modem completes implementing REFRESH, and completes the procedure without sending TERMINAL RESPONSE to the eUICC. The detailed description thereof will be understood with reference to UICC Reset of TS102.223.

If the modem receives an eUICC Profile State Change REFRESH command, the modem may perform an application session termination procedure, and may delete all cached values associated with a corresponding profile stored in the modem. The card may remain logical channel 0 used for transmission to ISD-R, may close all other channels, and may restore "default state after UICC activation and ATR" defined in ETSI TS 102 221. If the corresponding processing is complete, the modem may transmit TERMINAL RESPONSE to the eUICC.

At the point in time at which the disclosure is provided, if the eUICC processes profile enabling or disabling, the eUICC may select and transmit one of eUICC profile state change or UICC reset to the modem. Since a single profile is present in the eUICC up to the present, a problem does not occur, even though any one of the commands is received and resetting is performed in the manner of software (terminal operation when eUICC profile state change is received or the case in which the terminal performs initialization in the manner of software when UICC Reset is received), or hard resetting is performed by turning off all power of the device and restoring an initialization state using a reset pin or the like.

However, in the state in which a plurality of profiles are enabled, for example, in the state in which profile 1 and profile 2 are enabled simultaneously in the eUICC, if the above-mentioned operation is performed in order to change the state of profile 1, the network of profile 2 may be disconnected, which is a drawback. Accordingly, a method in which the eUICC transmits a REFRESH message depending on a situation is illustrated as described in FIGS. 4A and 4B. In the case in which the modem receives a REFRESH command from the eUICC in operation 8-05, if the modem currently does not operate in the MEP mode, the modem, upon reception of eUICC profile state change or UICC reset, may perform the corresponding command according to the conventional manner in operation 8-15.

The situation in which the modem currently operates in the MEP mode in operation 8-10 may be regarded as the case in which the terminal has performed an initialization procedure with the eUICC for eUICC MEP. In this instance, if a plurality of profile eSIM ports are produced, each eSIM port may be mapped or may not be mapped to a specific baseband in the modem. Subsequently, a profile enabled on a specific eSIM port may be capable of transmitting an APDU including a proactive command to the modem via the corresponding eSIM port. The modem may perform an operation corresponding to the content of the received APDU by identifying an eSIM port via which the received APDU is transmitted and applying the APDU to a memory area or a baseband mapped to the corresponding eSIM port.

As described above, if the ISD-R in the eUICC is multi-selected by multiple eSIM ports (if the LPA selects the ISD-R via the plurality of produced eSIM ports, and each eSIM port has a logical channel(s) to perform transmission and reception of an APDU with the ISD-R), the ISD-R may transfer a proactive command to the modem via each eSIM port. Depending on whether the eUICC and the modem currently satisfy operations 8-10 and 8-20, and according to the proactive command that the modem receives, operation of the modem may be changed, and at least one of the following 5 cases may be included.

As described in FIG. 4A and FIG. 4B, when a proactive command including a port number(s) or "all" is transmitted, the proactive command may be defined as a new mode of REFRESH proactive command or a new type of command.

For example, a proactive command may be defined to be in the form of a Platform reset mode (including "all") or a port reset mode (including a port number(s)) of a "reset" proactive command, or may be in the form in which a field or a value indicating a port number(s) is included in the existing "REFRESH" proactive command. Although the drawing provides description by taking a REFRESH proactive command as an example, the scope of the disclosure is not limited thereto.

Case 1 may start when the terminal receives a response message including a port number from the eUICC.

1. The case in which the MEP modem supports multi-selected ISD-R processing in operation 8-20, and information associated with a port or "all" is not included in the received message in operation 8-30.

A. implement a proactive command received via an eSIM port. If it indicates refreshing associated with profile state changing, this may be a REFRESH proactive command associated with eUICC profile state changing or UICC Rese in operation 8-35 (soft reset).

2. The case in which the MEP modem supports multi-selected ISD-R processing in operation 8-20, and information associated with a port(s) or "All" is included in a REFRESH command in operation 8-30

A. perform one of operation 8-45, operation 8-55, and operation 8-65 based on determination in operation 8-40, operation 8-50, and operation 8-60.

3. The case in which the MEP modem does not support multi-selected ISD-R processing 8-20, and a REFRESH command including UICC Reset+all port identifiers is received via a specific eSIM port in operation 8-40

A. implement hard reset (resetting based on power or a reset pin) in operation 8-45.

4. The case in which the MEP modem does not support multi-selected ISD-R processing 8-20, and a REFRESH command including eUICC profile state change+all port identifiers is received via a specific eSIM port in operation 8-50

A. implement REFRESH with respect to all ports (soft reset on all ports) in operation 8-55.

5. The case in which a REFRESH command including eUICC profile state change or UICC reset, together with Port ID information via a specific eSIM port in operation 8-60

A. implement REFRESH (Soft Reset) with respect to a port corresponding to the included port ID in operation 8-65. A plurality of port IDs may be present. If a plurality of port IDs are included, REFRESH may be implemented on ports corresponding to the included port IDs.

If it is determined that multi-selected ISD-R is not supported in operation 8-20, and information associated with a port number or "all" is not received, operation 8-15 or operation 8-35 may be performed depending on implementation by terminal.

If a plurality of port numbers are received, the modem may perform a network detach procedure for each port in order of reception, may delete values cached in each port, and may start a new card session by resetting the corresponding port. In addition, if the received ports occupy a network, the modem may perform a network detach procedure at once, may delete values cached in the ports at the same time, and may start a new card session by performing resetting for each port. This may be equally applied when the terminal (a terminal framework via the LPA) transmits a request including a plurality of port numbers to the modem so as to directly request the modem to perform resetting in operation 8-70.

If the ISD-R is selected only via a single port, refreshing of a port corresponding to the included port ID may be performed, for example, according to the following case.

The modem may identify corresponding port ID information, may implement UICC reset on the corresponding port, and may transmit a Reset command to the corresponding port.

The modem may identify corresponding port ID information, and may request polling from the corresponding port, so as to implement UICC reset or eUICC profile state change on the corresponding port according to the conventional manner.

Although not illustrated in the drawing, the ISD-R may be selected only by a single port, as described in FIG. 3A and FIG. 3B. In this instance, the port that uses the ISD-R may be considered as a port used for managing the other ports. The modem may differently process a proactive command received via the port for the purpose of management, and a proactive command received via ports for other purposes. Detailed description thereof will be described with reference to FIG. 12.

Figure 9A:
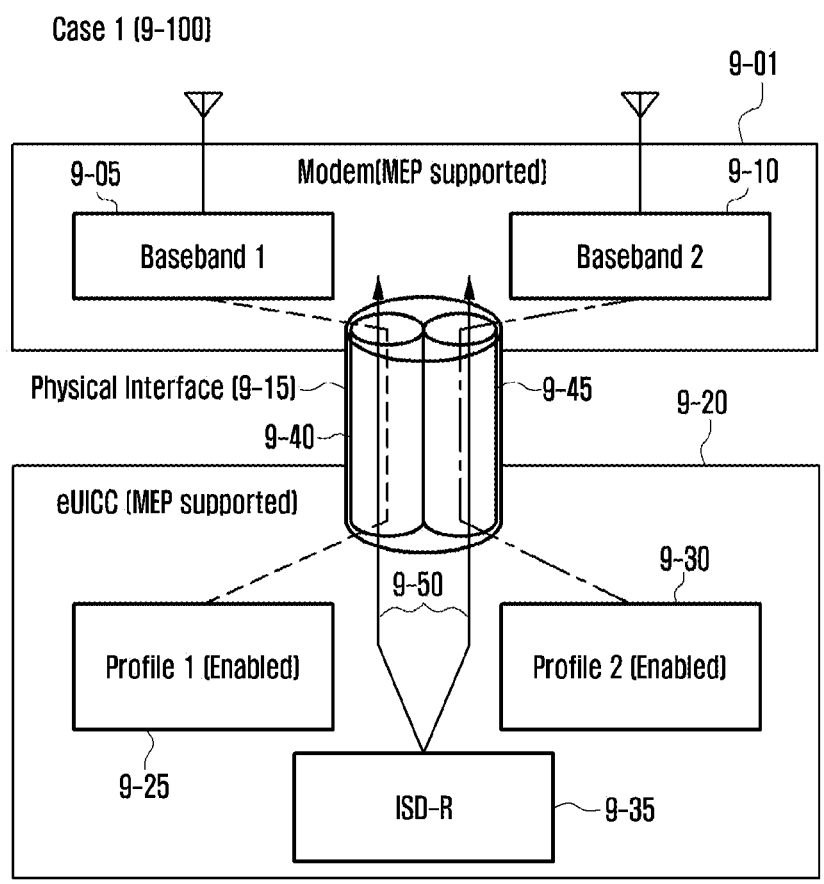
FIG. 9A is a diagram illustrating a multi-selected ISD-R in the process of connecting (case 1) a modem and a v3 eUICC in accordance with introduction of the concept of a virtual interface.
Figure 9B:
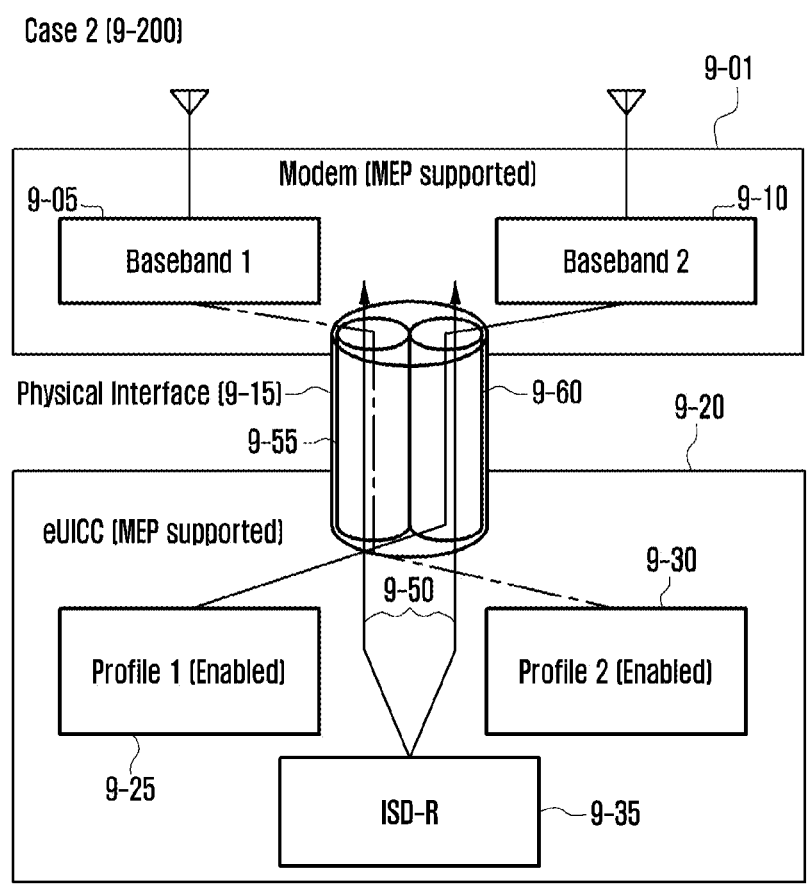
FIG. 9B is a diagram illustrating a multi-selected ISD-R in the process of connecting (case 2) a modem and a v3 eUICC in accordance with introduction of the concept of a virtual interface.

FIG. 9A and FIG. 9B are diagrams illustrating examples of a multi-selected ISD-R in the process of connecting a modem and a v3 eUICC in accordance with introduction of the concept of a virtual interface.

An eUICC 9-20 of FIGS. 9A and 9B is assumed as an eUICC that supports an MEP function that is capable of simultaneously enabling a plurality of profiles. A modem 9-01 is also assumed as a modem that supports an MEP function. FIG. 9 provides description by taking an example in which two basebands and two enabled profiles are present. Although mapping switching between basebands in the modem 9-01 and eSIM ports are possible, case 1 and case 2 describe logical terminal endpoint mapping in the modem 9-01 by taking baseband 1 9-05-channel 1 9-40 and baseband 2 9-10-channel 2 9-45 as an example.

As described in FIG. 2A and 2B, the current modem 1-15 is connected to the eUICC 1-20 via a single physical pin, and the corresponding modem and the eUICC may transmit an APDU command via the single channel 2-10 using the corresponding physical pin. The eUICC 9-20 that supports MEP may enable a plurality of profiles, and a corresponding enabled profile may need to perform APDU transmission with a specific baseband of the modem. Therefore, to process the same, the concept of multiplexing the physical interface 9-15 and separately transmitting an APDU via many channels 9-40 and 9-45 may be employed.

Hereinafter, for ease of description, if MEP is supported, a channel is referred to as an eSIM port. Channels are referred to as an eSIM port 1 9-40 and an eSIM port 2 9-45, respectively, and the channels are used as eSIM ports. After UICC reset or profile status change, the terminal may produce an APDU channel for transmission between the modem baseband and eUICC in the initialization process between the modem and the eUICC. In this instance, the terminal may set an ID for an eSIM port connected to each baseband. The corresponding port ID may be set in the modem or terminal platform and may be transferred to the LPA. In the present disclosure, the port ID may be interchangeably used with a port number for ease of description.

The modem may include as many eSIM ports as the number of basebands. However, the number of eSIM ports utilized by the eUICC 9-20 may be less than or equal to the number of profiles capable of being enabled simultaneously in the corresponding eUICC. A profile may transmit an APDU message using one of the eSIM ports.

According to case 1 9-100 of FIG. 9A, an APDU command corresponding to the enabled profile 1 9-25 may be transmitted to baseband 1 9-05 via eSIM port 1 9-40, and simultaneously, an APDU command corresponding to the enabled profile 2 9-30 may be transmitted to baseband 2 9-10 via eSIM port 2 9-45.

According to case 2 9-200 of FIG. 9B, an APDU command corresponding to the enabled profile 1 9-25 may be transmitted to baseband 2 9-10 via eSIM port 2 9-55, and simultaneously, an APDU command corresponding to the enabled profile 2 9-30 may be transmitted to baseband 1 9-05 via eSIM port 2 9-60.

The MEP supporting modem 9-01 may differently process an APDU command transmitted via each eSIM port by identifying a baseband the corresponding APDU command is to be connected. An ISD-R 9-35 may need to transmit command APDU to the modem in order to manage the state of the eUICC and a profile.

The LPA or the modem may determine to allow selecting an ISD-R 9-35 via a plurality of eSIM ports, according to an eUICC initialization process or a previous setting. This is referred to as a multi-selected state. In the multi-selected state, a message may be transmitted to or received from the ISD-R 9-35 via one eSIM port selected and determined by the LPA or the modem among the eSIM ports. Depending on whether a received message is a management message corresponding to profile 1 9-25 or profile 2 9-30, or a message associated with the entire eUICC, the ISD-R 9-35 may select an appropriate eSIM port and may transmit Response APDU including a proactive command via the corresponding port.

Figure 10:
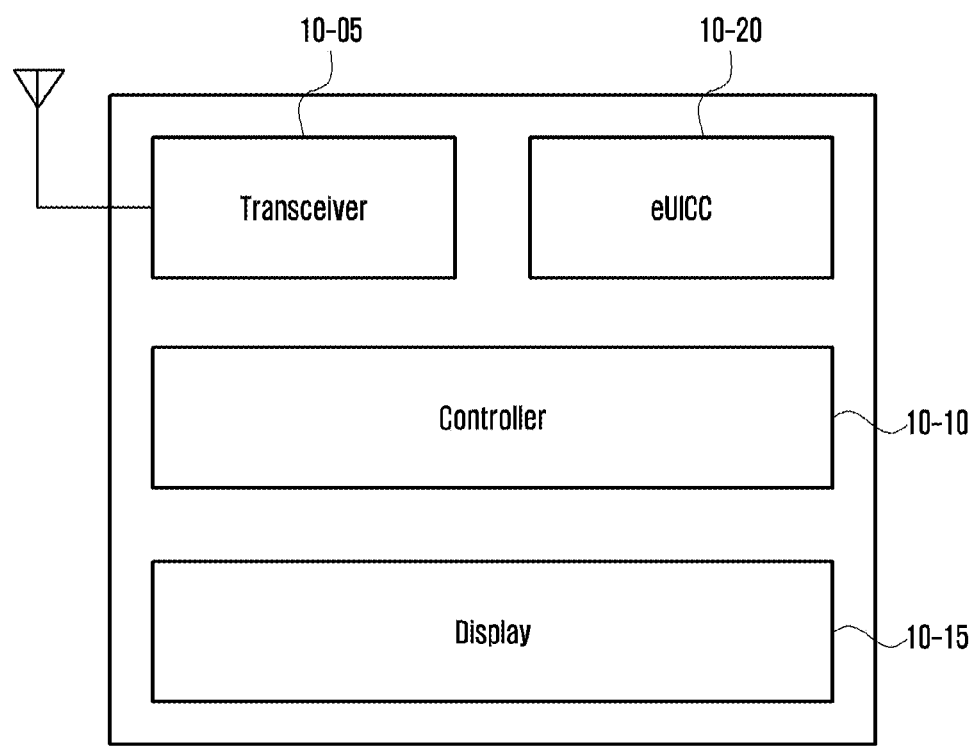
FIG. 10 is a diagram illustrating the block configuration of a terminal according to an embodiment of the disclosure.

FIG. 10 is a diagram illustrating the block configuration of a terminal according to an embodiment.

Referring to FIG. 10, the terminal includes a controller 10-10, a transceiver 10-05, a display 10-15, and an eUICC 10-20. As described above, the eUICC 10-20 may be configured inside the terminal, or may be configured as a separate entity or by being inserted into the terminal.

The transceiver 10-05 may correspond to a modem in the disclosure, and may perform signal transmission or reception with an SM-DP+.

The controller 10-10 of the terminal may control the operation and state of all terminal elements in the disclosure, so as to implement operation according to embodiments of the disclosure. For example, the controller may control at least one of an LPA, the modem, and the eUICC, so as to implement operation according to embodiments of the disclosure.

The display 10-15 may display, to a user, all or a part of port information, profile state information, a profile list, providable RAT information, and the like according to embodiments of the disclosure.

The eUICC 10-20 is controlled by the LPA or the controller 10-10, and the eUICC in the embodiments of the disclosure may implement each management command and may transmit a proactive command to the modem or the like.

Figure 11:
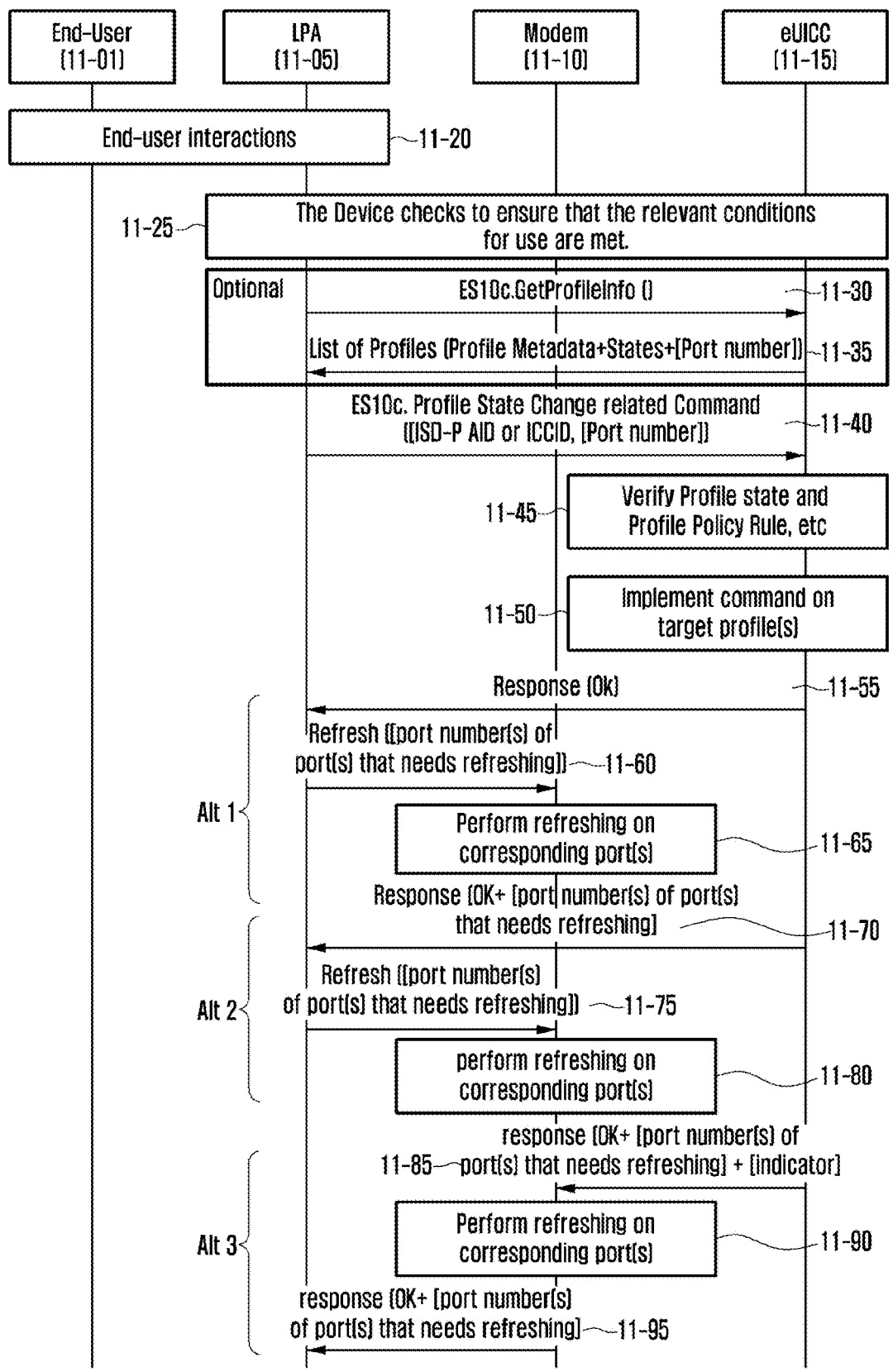
FIG. 11 is a diagram illustrating a refresh method that does not uses a proactive command according to an embodiment of the disclosure.

FIG. 11 is a diagram illustrating a refreshing method that does not uses a proactive command according to an embodiment of the disclosure.

FIG. 11 is a flowchart schematically illustrating a process of managing, by a user 11-01, a profile using an LPA 11-05 in an MEP supporting terminal. Descriptions will be provided under the assumption that the LPA 11-05, a modem 11-10, and an eUICC 11-15 in FIG. 11 all support MEP.

The end user 11-01 may implement a management command associated with a profile installed in the terminal based on information displayed in the LPA 11-05 or an application in which the LPA 11-05 is integrally implemented in operation 11-20. The example of a screen displayed on a user screen when the corresponding management command is implemented has been described with reference to FIG. 6. As described in the drawing, in the case in which an ES10c. command is transmitted without a refreshFlag parameter, the terminal, before transmitting an ES10c. command, may optionally identify whether the corresponding terminal satisfies the state of supporting the same in operation 11-25. For example, as defined in GSMA SGP.22, if a previously enabled profile is present, the satisfied state may be termination of an application session associated with a port occupied between a UICC and a modem, closing a logical channel, and the like.

If a user input or an RPM command is received, the LPA may transmit an ES10c command to the eUICC in operation 11-40. The eUICC that receives the corresponding message may verify the state for processing the corresponding command, such as the state information of a corresponding profile, profile policy rule, or the like, which the eUICC needs to identify upon reception of the corresponding command, as defined in GSMA SGP.22 in operation 11-45, and may send an error message as a response if there is a problem. Although commands that cause a change in the state of a profile among ES10c. commands is called a Profile State Change related command for ease of description, an ES10c. command may be one of ES10c.enableProfile, ES10c.disableProifle, ES10c.deleteProifle, and ES10c.euiccMemoryReset.

In order to transmit a proactive command, a card application toolkit (CAT) needs to be supported on the corresponding port, and the corresponding CAT is not supported on a port used by the ISD-R. In this instance, the LPA may transmit a profile state change related command without a refreshFlag parameter. In addition, although the CAT is supported, the eUICC does not request the modem to process refreshing, and instead, the LPA is requested to perform processing and the modem performs processing, according to implementation by the terminal. This corresponds to the case in which refreshFlag is not present when profile enabling is processed as illustrated in FIG. 5. The eUICC that receives a profile state change related command without a refreshFlag parameter may perform a processing operation (e.g., profile enabling, disabling, deleting, or the like) in the eUICC in association with a state change in the corresponding profile in operation 11-50, and the eUICC or LPA may transmit information associated with a port identified as needing refreshing to the modem so that the modem is capable of performing refreshing. The method may include one of the following methods.

Alt1: a method in which the LPA adds a port number(s) that needs refreshing and transmits the same to the modem The eUICC may send a result of processing a corresponding ES10c. command to the LPA as a response. The LPA may determine a port number(s) that requires refreshing and may store the same at a specific point in time after the point in time at which a user input is received, and may add the port number(s) that requires refreshing and transmit the corresponding refresh command to the modem in operation 11-60. If the modem receives the corresponding refresh command, the modem may perform refreshing processing on the corresponding ports(s) or at the platform level in operation 11-65. The modem may implement UICC Reset or eUICC profile state change on the port(s), of which refreshing is requested, as described in FIGS. 8A and 8B, and if an identifier indicating all ports is included, resetting may be performed to the entire platform in the similar manner as the current UICC reset.

A method of determining, by the LPA, a port number(s) that requires refreshing may be one of the following methods.

In the case of enabling/disabling/deleting a profile on a specific port: a port number included in the ES10c. command in operation 11-40

Additional determination in the case of enabling a profile on a specific port: A profile to which enabling is to be performed may be a profile that is enabled in advance on another port. In this instance, refreshing needs to be performed on all ports on which the corresponding profile has been enabled, in addition to the port number included in the ES10c. command of operation 11-40. The port number of the port on which the corresponding profile has been enabled may be determined by the LPA based on one of, or a combination of two of, an error message indicating that the profile is on another port and an additionally included port number, which are received from the eUICC between operation 11-45 and operation 11-50, or information 11-35 which is associated with a port on which the corresponding profile is enabled in advance, and which is obtained via GetProfileInfo( )11-30 in advance to implement the ES10c. command.

In the case of eUICC memory reset: In the case in which eUICC memory reset is transmitted in operation 11-40, the LPA may determine to use an identifier (e.g., "all") indicating all ports, instead of utilizing the information 11-35 which is associated with a port enabled for each profile and which is sent as a response via GetProfileInfo( ) according to the setting of the LPA.

Alt2: a method in which an eUICC adds a port number(s) that needs refreshing and transmits the same to the LPA, and the LPA transmits the corresponding information to the modem The eUICC may process a command associated with a target profile, and may transmit a result including a port number that needs refreshing as a response in operation 11-70. This may be a result of processing based on the ES10c. command, and may be the numbers of all ports that have a change in a profile-and-port mapping. For example, at least one case of the case in which a profile enabled on a port is changed or the case in which a profile enabled on a port is disabled, may be included and may be sent as a response. Alternatively, a new identifier which indicates all ports need resetting at a platform level, may be included and may be sent as a response. The eUICC may include at least one piece of information among the above-described information and may send the same to the LPA as a response. If the LPA that receives the information transfers the information associated with ports that need refreshing to the modem, the modem may perform refreshing on the corresponding ports or may perform refreshing at a platform level as described in Alt 1 in operation 11-80.

Alt3: a method in which the eUICC adds a port number(s) that needs refreshing and transmits the same to the LPA, and the modem parses the corresponding message in the middle so as to perform refreshing on port(s) corresponding to the port number(s) that needs refreshing.

The eUICC may process a command associated with a target profile, and may transmit a result including a port number that needs refreshing as a response in operation 11-85. This may be a result of processing based on the ES10c. command, and may be the numbers of all ports that have a change in a profile-and-port mapping. For example, at least one case of the case in which a profile enabled on a port is changed or the case in which a profile enabled on a port is disabled, may be included and may be sent as a response. Alternatively, a new identifier which indicates all ports need resetting at a platform level, may be included and may be sent as a response.

The MEP modem may parse all APDU messages between the LPA and the ISD-R in the middle, and may recognize the content thereof. Alternatively, the eUICC may add an indicator indicting that the corresponding MEP modem needs to parse a message and to recognize the content of the message, outside the corresponding response message, and may transmit the same in operation 11-85. If the eUICC transmits the corresponding message to the LPA in operation 11-85, the modem interprets the corresponding message included in APDU transmitted between the eUICC and a card, so that the modem may perform refreshing on the corresponding ports or may perform refreshing at a platform level as described in Alt1 in operation 11-90. In this instance, the modem may optionally add a result associated with completion of the corresponding processing to the message transmitted from the eUICC and transmit the same to the LPA in operation 11-95.

Figure 12:
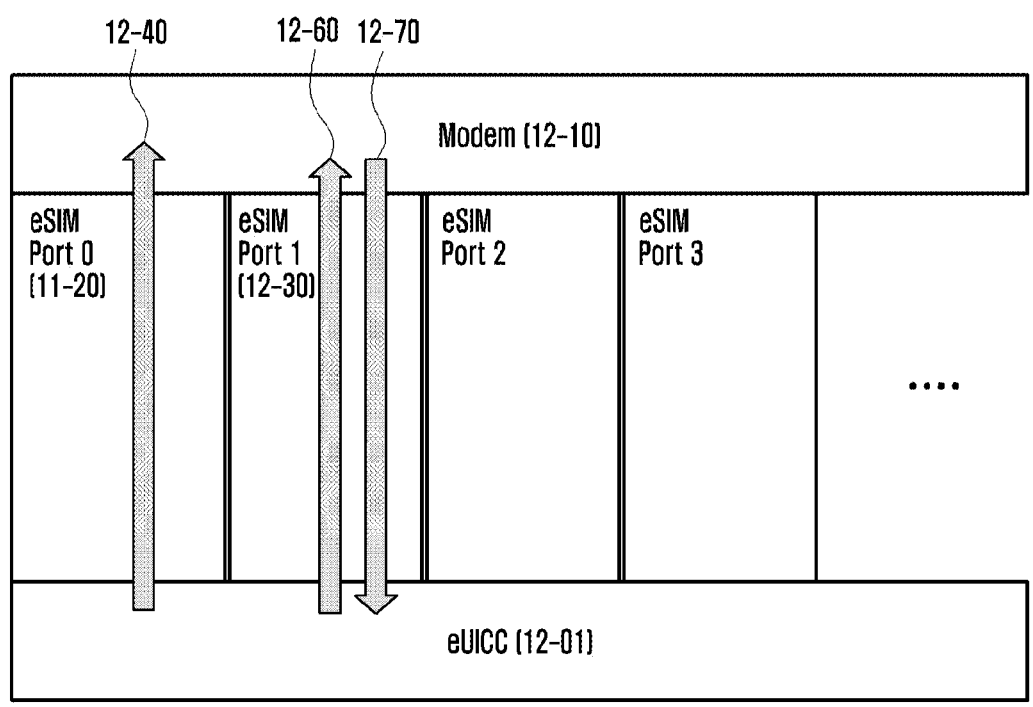
FIG. 12 is a diagram illustrating a method in which a modem differently processes a proactive command received via a port for the purpose of management and a proactive command received via a port for other purposes excluding management, according to an embodiment of the disclosure.

FIG. 12 is a diagram illustrating a method in a modem differently processes a proactive command received via a port for the purpose of management and a proactive command received via a port for other purposes, according to an embodiment of the disclosure.

FIG. 12 provides description under the assumption that eSIM Port 0 12-20 is a port that is only accessible by an ISD-R and is a port for the purpose of management, and eSIM Port 1 12-30 is a port that is not supposed to affect other ports and is a port that is not for management. In the case in which the ISD-R in the eUICC 12-01 transmit a proactive command including a port number(s) or all ports (all) to a modem via eSIM Port 0 12-20 in operation 12-40, if the modem identifies that the received proactive command is a proactive command that includes a port number(s) or all ports (all), the modem may implement the corresponding proactive command as described in FIGS. 8A and 8B. If the port number received in operation 12-40 is #1, the modem 12-10 may transmit a polling message associated with existence of a message to be fetched in operation 12-70, or the modem 12-10 may completely perform a resetting procedure associated with port 1 and may transmit a Reset command associated with the corresponding port. Although the eUICC 12-10 receives the Reset command in operation 12-70, if the corresponding port number is different from a port number included in the proactive command transmitted in operation 12-40, the eUICC 12-10 may additionally transmit an error associated therewith to the modem 12-10 as a response so as to report that the modem needs to transmit again a Reset command with the port number included in the proactive command transmitted in operation 12-40.

In the case in which the ISD-R in the eUICC 12-01 transmits a proactive command including a port number(s) or all ports (all) to the modem via eSIM Port 1 12-30, if the modem identifies that the received proactive command is proactive command that includes a port number(s) or all ports (all), the modem may reject the corresponding processing and may return an error associated therewith in operation 12-70.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a device operating with an embedded universal integrated circuit card (eUICC) in a wireless communication system, the method comprising:
    identifying, by a local profile assistant (LPA) of the device, information associated with a target profile required to be enabled;
    sending, by the LPA to the eUICC, a first message to enable the target profile, the first message including a refresh flag indicating whether a refresh of the target profile is required and a port number of a target port corresponding to the target profile;
    in case that the refresh flag indicates that the refresh of the target profile is required, receiving, by a baseband component of the device from the eUICC, a second message to trigger the refresh of the target port; and
    after receiving the second message, sending, by the baseband component to the eUICC, a terminal response message, or resetting, by the baseband component, the target port.

2. The method of claim 1,
    wherein the target profile is enabled on the target port.

3. The method of claim 1, wherein the first message is sent on a predetermined port different than the target port.

4. The method of claim 1, wherein the information associated with the target profile required to be enabled is obtained based on a user input.

5. The method of claim 1, wherein the device supports multiple enabled profiles.

6. A method performed by an embedded universal integrated circuit card (eUICC) operating with a device in a wireless communication system, the method comprising:
    receiving, from a local profile assistant (LPA) of the device which identifies information associated with a target profile required to be enabled, a first message to enable the target profile, the first message including a refresh flag indicating whether a refresh of the target profile is required and a port number of a target port corresponding to the target profile;
    in case that the refresh flag indicates that the refresh of the target profile is required, sending, to a baseband component of the device, a second message to trigger the refresh of the target port; and
    after sending the second message, upon reception of a terminal response message from the baseband component or after resetting the target port, enabling the target profile on the target port.

7. The method of claim 6, wherein the first message is received on a predetermined port different than the target port.

8. The method of claim 6, wherein the enabling of the target port on the target port further comprises in case that another profile is currently enabled on the target port, disabling the other profile and enabling the target port on the target port.

9. The method of claim 6, wherein the eUICC supports multiple enabled profiles.

10. A device operating with an embedded universal integrated circuit card (eUICC) in a wireless communication system, the device comprising:
    a local profile assistant (LPA) configured to:
        identify information associated with a target profile required to be enabled, and
        send, to the eUICC, a first message to enable the target profile, the first message including a refresh flag indicating whether a refresh of the target profile is required and a port number of a target port corresponding to the target profile; and a baseband component configured to:
in case that the refresh flag indicates that the refresh of the target profile is required, receive, from the eUICC, a second message to trigger the refresh of the target port, and after receiving the second message, send, to the eUICC, a terminal response message, or reset the target port.

11. The device of claim 10, wherein the target profile is enabled on the target port.

12. The device of claim 10, wherein the first message is sent on a predetermined port different than the target port.

13. The device of claim 10, wherein the information associated with the target profile required to be enabled is obtained based on a user input.

14. The device of claim 10, wherein the device supports multiple enabled profiles.

15. An embedded universal integrated circuit card (eUICC) operating with a device in a wireless communication system, the eUICC configured to:
receive, from a local profile assistant (LPA) of the device which identifies information associated with a target profile required to be enabled, a first message to enable the target profile, the first message including a refresh flag indicating whether a refresh of the target profile is required and a port number of a target port corresponding to the target profile;

in case that the refresh flag indicates that the refresh of the target profile is required, send, to a baseband component of the device, a second message to trigger the refresh of the target port; and after sending the second message, upon reception of a terminal response message from the baseband component or after resetting the target port, enable the target profile on the target port.

16. The eUICC of claim 15, wherein the first message is received on a predetermined port different than the target port.

17. The eUICC of claim 15, wherein the eUICC is further configured to in case that another profile is currently enabled on the target port, disable the other profile and enabling the target port on the target port.

18. The eUICC of claim 15, wherein the eUICC supports multiple enabled profiles.

* * * * *